(12) United States Patent
Preston

(10) Patent No.: US 9,835,735 B2
(45) Date of Patent: Dec. 5, 2017

(54) SIPM-BASED RADIATION DETECTION SYSTEMS AND METHODS

(71) Applicant: FLIR Detection, Inc., Stillwater, OK (US)

(72) Inventor: Jeffrey Robert Preston, Knoxville, TN (US)

(73) Assignee: FLIR Detection, Inc., Stillwater, OK (US)

( * ) Notice: Subject to any disclaimer, the term of this patent is extended or adjusted under 35 U.S.C. 154(b) by 0 days.

(21) Appl. No.: 15/164,775

(22) Filed: May 25, 2016

(65) Prior Publication Data

US 2016/0266260 A1 Sep. 15, 2016

Related U.S. Application Data

(63) Continuation of application No. PCT/US2014/067489, filed on Nov. 25, 2014.
(Continued)

(51) Int. Cl.
*G01T 1/20* (2006.01)
*G01T 1/29* (2006.01)
(Continued)

(52) U.S. Cl.
CPC .............. *G01T 1/2018* (2013.01); *G01T 1/02* (2013.01); *G01T 1/208* (2013.01); *G01T 1/2907* (2013.01)

(58) Field of Classification Search
CPC ......... G01T 1/02; G01T 1/2018; G01T 1/208; G01T 1/2907
See application file for complete search history.

(56) References Cited

U.S. PATENT DOCUMENTS 7,439,509 B1 * 10/2008 Grazioso ............... G01T 1/2018
250/338.4
9,588,230 B2 * 3/2017 Grazioso ............... G01T 1/1644
(Continued)

FOREIGN PATENT DOCUMENTS

EP 2381475 10/2011
WO WO 2007/009495 1/2007
(Continued)

OTHER PUBLICATIONS

Bencardino et al., "Anti-Coincidence Rejection of SiPM Dark Pulses for Improved Detection of Low Energy Radiation", Nuclear Instruments and Methods in Physics Research A, pp. 497-500, Nov. 1, 2009, University of Wollongong, NSW, Australia.
(Continued)

*Primary Examiner* — Mark R Gaworecki
(74) *Attorney, Agent, or Firm* — Haynes and Boone, LLP

(57) ABSTRACT

Techniques are disclosed for systems and methods using silicon photomultiplier (SiPM) based radiation detectors to detect radiation in an environment. An SiPM-based radiation detection system may include a number of detector assemblies, each including at least one scintillator providing light to a corresponding SiPM in response to ionizing radiation entering the scintillator. The radiation detection system may include a logic device and a number of other electronic modules to facilitate reporting, calibration, and other processes. The logic device may be adapted to process detection signals from the SiPMs to implement different types of radiation detection procedures. The logic device may also be adapted to use a communication module to report detected radiation to an indicator, a display, and/or a user interface.

22 Claims, 30 Drawing Sheets

Related U.S. Application Data

(60) Provisional application No. 61/909,311, filed on Nov. 26, 2013.

(51) Int. Cl.
   *G01T 1/02* (2006.01)
   *G01T 1/208* (2006.01)

(56) References Cited

U.S. PATENT DOCUMENTS

| | | | |
|---|---|---|---|
| 2010/0065746 A1 | 3/2010 | Grazioso et al. | |
| 2010/0187424 A1* | 7/2010 | Majewski | A61B 6/037 250/363.05 |
| 2010/0288935 A1* | 11/2010 | Majewski | A61B 6/037 250/363.03 |
| 2011/0017918 A1* | 1/2011 | Baeumer | G01T 1/17 250/370.11 |
| 2012/0068076 A1* | 3/2012 | Daghighian | A61B 6/037 250/363.03 |
| 2013/0092842 A1* | 4/2013 | Zhang | G01T 1/208 250/363.03 |
| 2013/0193330 A1* | 8/2013 | Wagadarikar | G01T 1/1648 250/362 |
| 2013/0228889 A1* | 9/2013 | Dolgoshein | H01L 27/1446 257/448 |
| 2014/0184197 A1* | 7/2014 | Dolinsky | G01J 11/00 324/96 |
| 2015/0041627 A1* | 2/2015 | Webster | H01L 27/144 250/208.2 |
| 2015/0060686 A1* | 3/2015 | DeVolpi | G01T 3/00 250/390.1 |

FOREIGN PATENT DOCUMENTS

| | | |
|---|---|---|
| WO | WO 2007/144624 | 12/2007 |
| WO | WO 2011/132162 | 10/2011 |

OTHER PUBLICATIONS

C. Michel et al., "Monte Carlo Simulation of Complex Germanium Detector Systems and Compton Suppression Spectrometers", Nuclear Instruments and Methods in Physics Research A251, pp. 119-133, Apr. 21, 1986, North-Holland, Amsterdam.

Francesco Licciulli et al., "A Novel Technique for the Stabilization of SiPM Gain Against Temperature Variations", IEEE Transactions on Nuclear Science, pp. 606-611, vol. 60, No. 2, Apr. 2013.

A. Osovizky et al., "An Innovation Personal Radiation Detector Based on a Scintillation Detector and a Silicon Photomultiplier", Nuclear Instruments and Methods in Physics Research A, pp. 41-44, Jan. 12, 2011, Israel.

R. Arlt et al., "Spectral Personal Radiation Detectors (SPRDs) a New Equipment Category for Use by Front Line Officers and First Responders", 2006 IEEE Nuclear Science Symposium Conference Record, pp. 304-306, 2006.

* cited by examiner

SIPM-BASED RADIATION DETECTION SYSTEMS AND METHODS

CROSS-REFERENCE TO RELATED APPLICATIONS

This application claims the benefit of International Patent Application No. PCT/US2014/067489 filed Nov. 25, 2014 and entitled "SiPM-BASED RADIATION DETECTION SYSTEMS AND METHODS", which is incorporated herein by reference in its entirety.

International Patent Application No. PCT/US2014/067489 filed Nov. 25, 2014 claims the benefit of U.S. Provisional Patent Application No. 61/909,311 filed Nov. 26, 2013 and entitled "SiPM-BASED RADIATION DETECTION SYSTEMS AND METHODS" which is hereby incorporated by reference in its entirety.

TECHNICAL FIELD

One or more embodiments of the invention relate generally to radiation detection systems and more particularly, for example, to systems and methods for detecting radiation using SiPM-based sensors.

BACKGROUND

Scintillation radiation detectors have traditionally used photomultiplier vacuum tube (PMT) technology developed in the 1930's. However, PMTs are labor intensive and expensive to manufacture and have several drawbacks with regards to mechanical shock, magnetic interference, high voltage (e.g., 1000V or more) requirements, and photocathode degradation from exposure to ambient light during manufacture.

Attempts have been made to replace PMTs with less fragile counterparts, but such replacements have typically suffered from reduced sensitivity, high levels of thermal drift, and/or extensive, complex, and costly electronic amplification circuitry. Thus, there is a need for an improved methodology for detecting radiation that is relatively inexpensive to implement, that is relatively rugged and/or immune to harsh environments, and that is adaptable to operate with overall detector sensitivities comparable to PMT-based methodologies.

SUMMARY

Techniques are disclosed for systems and methods using silicon photomultiplier (SiPM) based radiation detectors to detect radiation in an environment. In one embodiment, an SiPM-based radiation detection system may include a number of detector assemblies, each including at least one scintillator providing light to a corresponding SiPM in response to ionizing radiation entering the scintillator. The radiation detection system may include a logic device and a number of other electronic modules to facilitate reporting, calibration, and other processes. The logic device may be adapted to process detection signals from the SiPMs to implement different types of radiation detection, as described herein. The logic device may also be adapted to use a communication module to report detected radiation to an indicator, a display, and/or a user interface, for example.

In one embodiment, a system comprises one or more scintillators; at least one SiPM adapted to receive light from the one or more scintillators; and a logic device configured to communicate with the at least one SiPM, wherein the logic device is adapted to receive detection signals from the at least one SiPM; process the detection signals according to an operational mode for the at least one SiPM; and determine detection events from the processed detection signals in accordance with the operational mode.

In another embodiment, a method comprises receiving detection signals from at least one SiPM adapted to receive light from one or more scintillators; processing the detection signals according to an operational mode for the at least one SiPM; and determining detection events from the processed detection signals in accordance with the operational mode.

In another embodiment, a system comprises two or more scintillators; absorber material disposed along a surface of the two or more scintillators; at least one SiPM adapted to receive light from the two or more scintillators; and a logic device configured to communicate with the at least one SiPM, wherein the logic device is adapted to receive detection signals from the at least one SiPM; process the detection signals according to an operational mode for the at least one SiPM; and determine detection events from the processed detection signals in accordance with the operational mode.

In another embodiment, a method comprises receiving detection signals from at least one SiPM adapted to receive light from two or more scintillators, wherein an absorber material is disposed along a surface of the two or more scintillators; processing the detection signals according to an operational mode for the at least one SiPM; and determining detection events from the processed detection signals in accordance with the operational mode.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
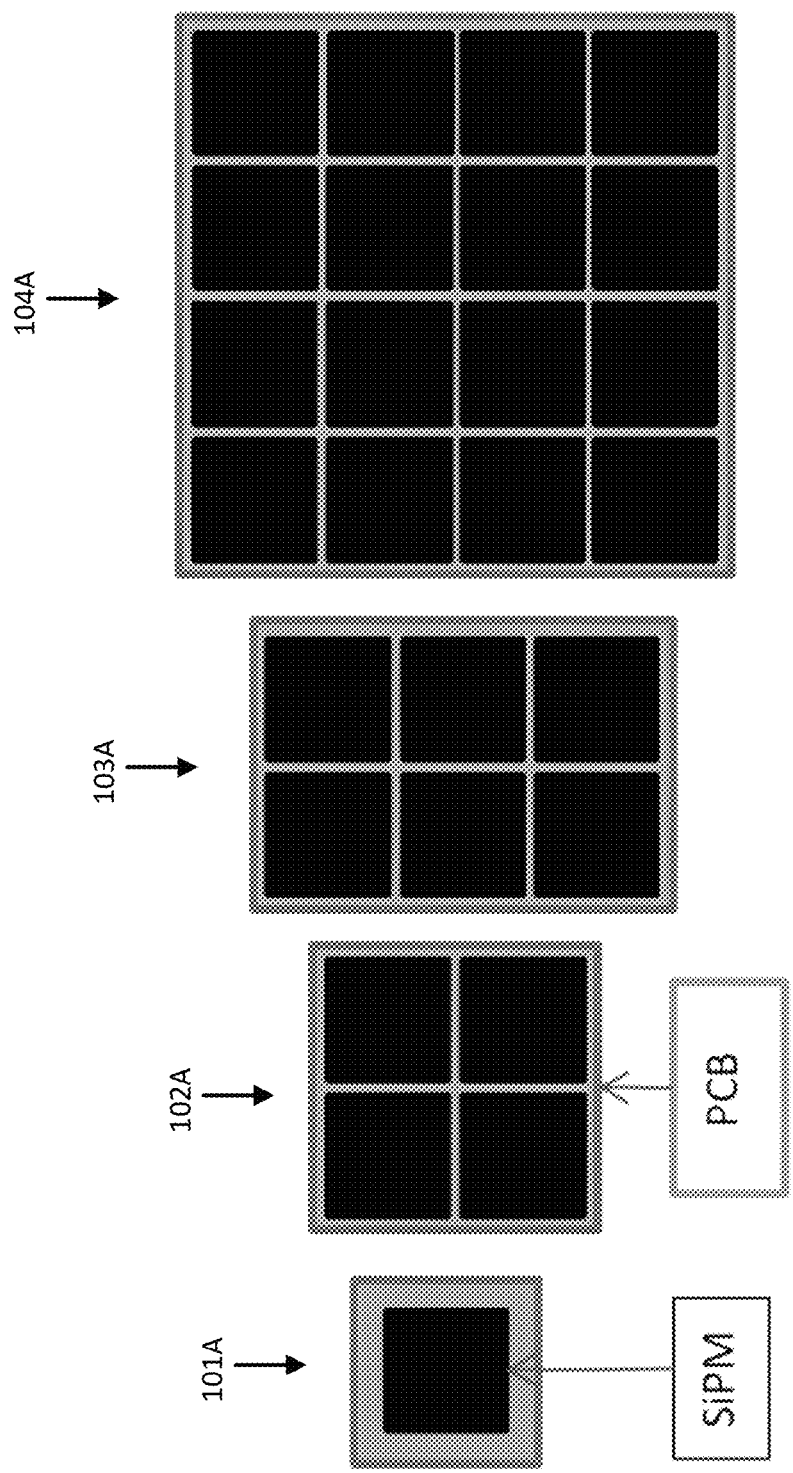
FIG. 1A illustrates block diagrams of SiPM assemblies in accordance with an embodiment of the disclosure.

At the core of various embodiments of the present disclosure lies a newly available integrated circuit that applies the breakdown phenomenon to a pixelated silicon wafer, enabling signals from the pixels to be combined and form a silicon photomultiplier (SiPM). With the advancement in mass-produced silicon to be sensitive to the blue wavelength emitted by the ubiquitous sodium iodide (NaI(Tl)) detectors, SiPMs are now applicable to the radiation detection field at a much reduced cost of goods compared to the conventional PMT.

The embodiments described herein are based on the recent availability of silicon light readout that offers comparable gain to a conventional PMT, similar sensitivity (quantum efficiency) to the blue wavelengths, a monolithic silicon design that is not susceptible to mechanical shock or magnetic interference, low-voltage operation (24.5V-32V), and that is able to be assembled in ambient light without degradation of the photocathode.

The most basic embodiments described herein are based on one or more SiPMs (e.g., SiPM chips, pixels, or assemblies) that are coupled to at least one scintillator, whereby signals from each SiPM may be combined in various ways to match a given application. Particularly important aspects include a relatively small light readout, electronics integrated with the SiPM, and an overall ruggedized, compact design.

In some embodiments, the SiPMs described herein have increased sensitivity to blue light about the wavelength of 420 nm as compared to PMTs and conventional semiconductor structures such as Geiger mode avalanche photodiode (APD) devices. Sensitivity of an SiPM is given in terms of photon detection efficiency (PDE), which is defined as the number of microcells triggered to the number of incident photons on the entire surface of the device. PDE is a function of the wavelength of incident light and the bias voltage of the SiPM. In the equation below, the quantum efficiency (QE) is a material property defined as the ratio of the number of photoelectrons emitted from a photosensitive surface to the number of incident photons, c is the probability of an avalanche event occurring at a given bias voltage V, and F is the fill factor or surface area occupied by active silicon as opposed to the traces separating the active regions.

$$PDE(\lambda, V) = QE(\lambda) \cdot \epsilon(V) \cdot F$$

The SiPMs described herein typically have a PDE of at least 25% at 420 nm and that may be variable according to the gain required for a given application. Conventional semiconductor structures (e.g., including conventional SiPMs) have peak PDEs at relatively undesirable wavelengths, and thus are not desirable for specific applications described herein. For example, conventional semiconductor structures have peaks PDEs that are approximately 40% lower, are at significantly higher (e.g., less desirable—such as ~500 nm) wavelengths, and/or are associated with bias voltages twice as large as those described herein (e.g., 70V or more). In addition, the temperature dependence of the breakdown voltage for embodiments described herein is typically less than half that for conventional semiconductor structures (e.g., 21.5 mv/° C. vs. 56 mV/° C.), thereby providing higher temperature stability in relatively harsh environments. With respect to conventional PMTs, QE/PDEs of PMTs are comparable, but the bias voltages used are typically on the order of 1500V (vs. 24V to 32V, or lower, for SiPM embodiments described herein). As noted herein, PMTs are also sensitive to magnetic fields, which requires expensive nickel-iron alloys for magnetic shielding.

Surface mounted SiPMs allow for very compact designs that may take many different general forms. SiPMs (e.g., the SiPM chips, printed circuit boards (PCB's), and associated connectors) can be less than 10 mm thick (excluding a coupled scintillator), compared to existing designs with a PMT that by itself is at least 60 mm thick and is typically much larger. For example, an SiPM chip may be approximately 1 mm thick, or between 0.5 mm and 2 mm thick for example, and optional packaging (e.g., PCB, connectors, support structure, package housing, and other packaging structures) may be 9 mm thick, or between 2 mm and 30 mm thick, depending on various packaging requirements.

A PCB for an SiPM typically includes/supports at least one SiPM chip (e.g., having a number of individual SiPM pixels), a voltage filter, and a connector/interface. The PCB may also include a temperature probe, an LED for stabilization, a voltage supply, and a logic device (e.g., a microcontroller) for feedback control and stabilization. FIG. 1A illustrates block diagrams of SiPM assemblies in accordance with an embodiment of the disclosure. As shown in FIG. 1A, a single PCB may include one or multiple SiPM chips to meet a specific performance criterion for a particular application. Each SiPM chip may include one or more SiPM pixels, such as those shown in FIGS. 1B and 1C.

Figure 1B:
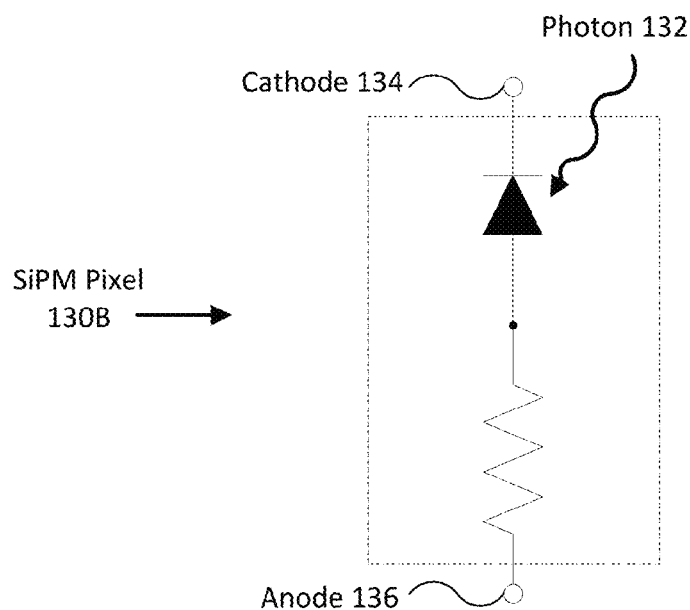
FIG. 1B illustrates a block diagram of an SiPM pixel in accordance with an embodiment of the disclosure.
Figure 1C:
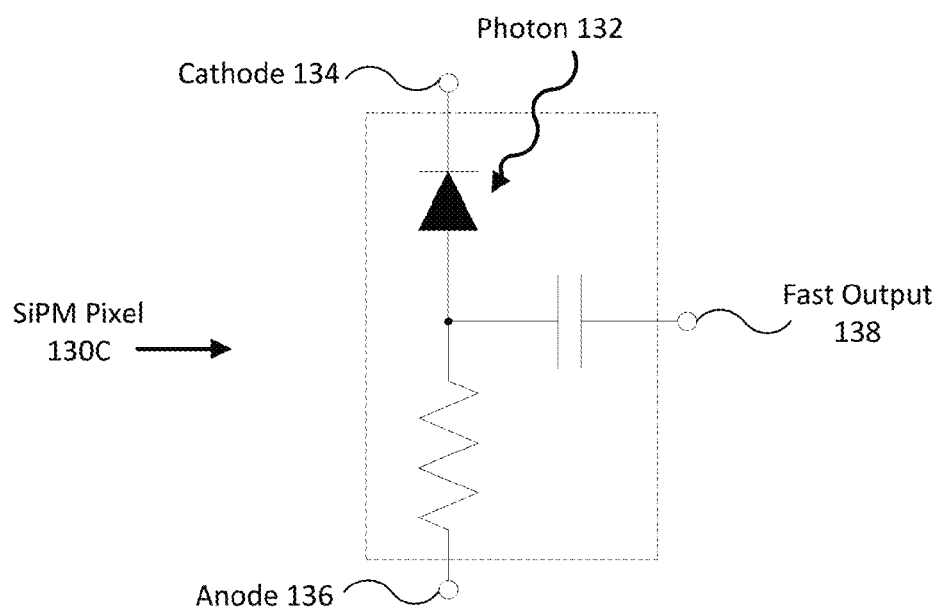
FIG. 1C illustrates a block diagram of an SiPM pixel in accordance with an embodiment of the disclosure.

FIG. 1B illustrates a block diagram of a typical SiPM pixel 130B in accordance with an embodiment of the disclosure. SiPM pixel 130B includes cathode 134 and anode 136 resistively coupled across a semiconductor (e.g., silicon) diode structure that is responsive to photon 132. As shown in more detail in FIG. 1D, and described more fully herein, a bias voltage may be established across cathode 134 and anode 136 to help SiPM pixel 130B provide a response substantially proportional to the energy of photon 132. FIG. 1C illustrates a block diagram of another embodiment SiPM pixel 130C in accordance with an embodiment of the disclosure. For example, in some embodiments, SiPM pixel 130C may include a fast output 138 capacitively coupled to a semiconductor (e.g., silicon) diode structure that is responsive to photon 132. As shown in more detail in FIG. 1D, and described more fully herein, a bias voltage may be established across cathode 134 and anode 136 of SiPM pixel 130C to help SiPM pixel 130C provide a response (e.g., at cathode 134) substantially proportional to the energy of photon 132, and/or a fast response at fast output 138 (e.g., having a rise time ranging from 100 ps to 1 ns and a pulse width ranging from 300 ps to 3 ns, for example).

Figure 1D:
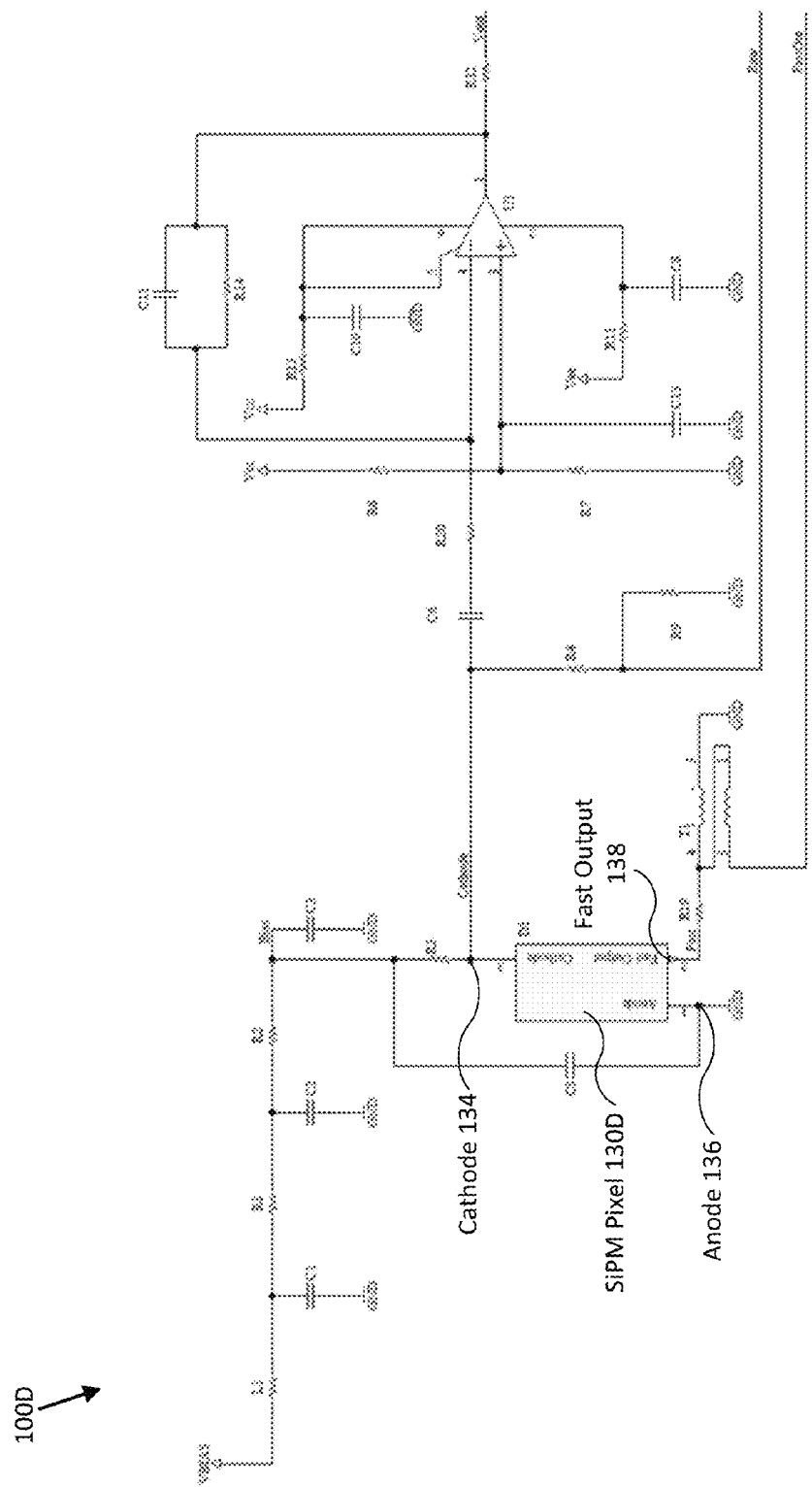
FIG. 1D illustrates a block diagram of an SiPM readout circuit in accordance with an embodiment of the disclosure.

FIG. 1D illustrates a block diagram of an SiPM readout circuit 100E in accordance with an embodiment of the disclosure. As shown in FIG. 1D, a readout circuit may be configured to provide a filtered bias voltage across cathode 134 and anode 136 of SiPM pixel 130D. In some embodiments, SiPM pixel 130D may include fast output 136 coupled to further readout electronics (not explicitly shown in FIG. 1D) through transformer T1. Also shown in FIG. 1D is amplifier (e.g., an operational amplifier) coupled to cathode 134 and providing amplified output Vout to further readout electronics. For example, further readout electronics may include analog to digital converters, amplifiers, filters, microprocessors, other analog and/or digital electronics, and/or other components coupled to a printed circuit board, such as those described with respect to SiPM-based radiation detection system 100E of FIG. 1E. SiPM readout circuit 100E may, in some embodiments, include a number of resisters R, capacitors C, transformers T, supply voltages (e.g., Vcc and Vee), and/or amplifiers U, in a general organization as that shown in FIG. 1D, for example, to provide an overall operational mode or selection of operational modes. In other embodiments, SiPM readout circuit 100E may include a different organization of components, such as supplying a bias voltage without a readout for fast output 138, for example, or providing an adjustable bias voltage and/or amplification, as described herein.

Figure 1E:
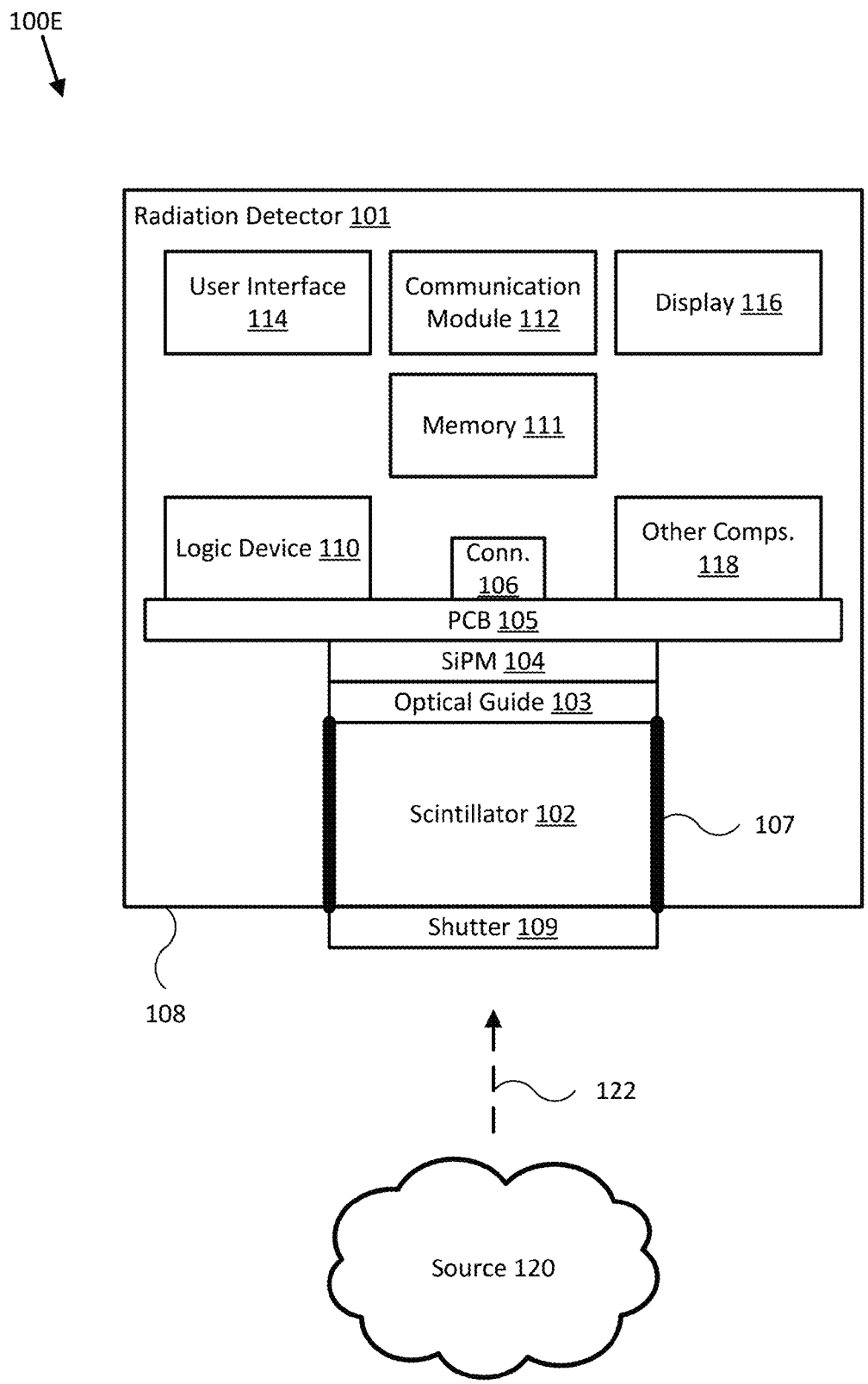
FIG. 1E illustrates a block diagram of an SiPM-based radiation detection system in accordance with an embodiment of the disclosure.

FIG. 1E illustrates a block diagram of an SiPM-based radiation detection system 100E, which includes an SiPM 104 supported by a PCB 105 in accordance with an embodiment of the disclosure. As shown by the embodiment presented in FIG. 1E, SiPM-based radiation detector 101 may include a variety of components adapted to detect ionizing radiation 122 produced by source 120 and report detections to other devices or a user as described herein. In some embodiments, system 100E may report the detection of radiation by aggregating detection data to provide an accumulated dosage, spectrograph, or material identification of radiation detected by system 100E, and then transmitting the radiation data to a display. In other embodiments, system 100E may report detections by energizing an LED indicator and/or transmitting an alert or notification signal to a component (e.g., an alarm, or an electrical switch or relay) of a notification system.

In the embodiment shown in FIG. 1E, SiPM-based radiation detector 101 includes a scintillator 102 and an SiPM 104 coupled to a PCB 105. As described more fully herein, scintillator 102 may be implemented with a variety of structures and materials adapted to interact with ionizing radiation 122 to produce photons that may, in-turn, be detected (e.g., converted to electrical signals) by SiPM 104. SiPM 104 may be implemented as any silicon-based pixelated semiconductor device adapted to convert photons (e.g., with wavelengths corresponding to those emitted by scintillator 102) entering pixels into per-pixel electrical signals, as described herein. PCB 105 may be a conventional printed circuit board, for example, and be adapted to provide electrical access to SiPM 104 (e.g., through various metal traces and/or connector 106) as well as physical support for SiPM 104 and/or scintillator 102. Connector 106 may be implemented as a relatively small (e.g., relative to a connector used to access a PMT) electrical connector adapted to support analog and/or digital coupling to PCB 105.

Optionally, detector 101 may include a variety of components adapted to facilitate operation of and electrical access to SiPM 104. For example, detector 101 may include optical guide 103 and/or reflector 107 to guide photons generated within scintillator 102 (e.g., scintillator photons) to an interfacing surface of SiPM 104. In various embodiments, optical guide 103 may be adapted to compensate for surface mismatch between scintillator 102 and SiPM 104, and reflector 107 may be adapted to reflect scintillator photons towards SiPM 104. In some embodiments, reflector 107 may alternatively or additionally be disposed across a source-side surface of scintillator 102, for example, and/or be extended or otherwise adapted to block external photons from entering scintillator 102 and/or reaching SiPM 104.

As shown in FIG. 1E, similarly optional components may include shutter 109 and a variety of electrical and/or electronic components coupled to PCB 105 and/or supported by housing 108. In some embodiments, shutter 109 may be implemented as a mechanical or removable radiation shield adapted to selectively block or substantially reduce one or more components of ionizing radiation 122. For example, shutter 109 may be implemented with a high-Z material capable of substantially blocking alpha, beta, and relatively low energy gamma radiation from entering scintillator 102, but allowing neutron and/or high energy gamma radiation. In various embodiments, shutter 109 may be actuated (e.g., opened and/or closed) electronically by logic device 110, for example. Shutter 109 may be coupled to/supported by housing 108, for example, and housing 108 may be adapted to provide similar or differentiated radiation shielding relative to shutter 109. In some embodiments, shutter 109 and/or housing 108 may be implemented, at least in part, using lead and/or tungsten panels, foil, and/or other structures, as described herein. In some embodiments, housing 108 may be adapted to protect system 100E from environmental conditions associated with space or atmospheric flight, and/or other outdoor environmental conditions, such as stationary or articulated mounting on a terrestrial structure, for example. In other embodiments, housing 108 may be adapted for handheld use.

Each of logic device 110, memory 111, user interface 114, communication module 112, display 116, and other components 118, if optionally included in detector 101, may be coupled to PCB 105 or to housing 108, for example, depending on a desired application and/or overall size of scintillator 102, SiPM 104, PCB 105, and/or connector 106 (e.g., a detector assembly). In other embodiments, any one or group of such components may be implemented externally to detector 101, for example, and/or in a distributed or grouped manner (e.g., multiple logic devices 110 operating detector 101, or multiple detectors 101 operated by a single logic device 110).

In some embodiments, logic device 110 may be implemented as any appropriate processing device (e.g., microcontroller, processor, application specific integrated circuit (ASIC), field programmable gate array (FPGA), or other logic device) that may be used by system 100E to execute appropriate instructions, such as software instructions and/or signal processing operations for detecting radiation using scintillator 102 and SiPM 104. Further, logic device 110 may be implemented with various signal processing devices, such as analog to digital converters (ADCs), trigger inputs, timing circuitry, and other signal processing devices as described herein.

In various embodiments, at least some portion or some functionality of logic device 110 may be part of or implemented with other existing logic devices of separate systems, such as a server, a personal electronic device (e.g., a mobile phone, smartphone, tablet device, laptop computer, desktop computer), and/or any other device that may be used to process, report, or act on radiation detected by system 100E. In other embodiments, logic device 110 may be adapted to interface and communicate with various external logic devices and associated components and/or perform various operations in a distributed manner.

In general, logic device 110 may be adapted to interface and communicate with other components of system 100E to perform the methods and processes described herein. For example, logic device 110 may be adapted to perform gross counting operations, spectrometry, or stabilization/calibration methods described herein. In one embodiment, logic device 110 may be adapted to use communication module 112 to report radiation detection to display 116 and display a dose amount or an alert notification, for example, or display an image of a spectrographic map. In another embodiment, logic device 110 may be adapted to use communication module 112 to establish a wired or wireless communication link with a portal radiation detection system, for example, and report counts, energies, transient characteristics, and/or other characteristics of detected radiation.

Memory 111 is typically in communication/configured to communicate with at least logic device 110 and may include one or more memory devices (e.g., memory components) to store information, including radiation detection data, calibration data, other types of sensor data, and/or software instructions. Such memory devices may include various types of volatile and non-volatile information storage devices, such as RAM (Random Access Memory), ROM (Read-Only Memory), EEPROM (Electrically-Erasable Read-Only Memory), flash memory, a disk drive, and/or other types of memory. In one embodiment, memory 111 may include a portable memory device that can be removed from system 100E and used to convey stored data to other systems for further processing and inspection.

Communication module 112 may be configured to facilitate communication and interfacing between various components of system 100E (e.g., between logic device 110 and memory 111 and/or display 116) and/or various external devices, such as a wireless access point, a personal electronic device, a server, and/or other detectors. For example, components such as user interface 114 and display 116 may transmit and receive data to and from logic device 110 through communication module 112, which may be adapted to manage wired and/or wireless communication links between the various components. As such, communication module 112 may support various interfaces, protocols, and standards for local system networking, such as the controller area network (CAN) bus, the local interconnect network (LIN) bus, the media oriented systems transport (MOST) network, or the ISO 11738 (or ISO bus) standard.

In some embodiments, logic device 110 may be adapted to communicate, via communication module 112, with a remote user interface, a notification system, or other detection systems to, for example, aggregate reports from multiple systems or sensors and/or implement a particular detection and/or notification method. As such, communication module 112 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), a mobile cellular component, a wireless satellite component, or other appropriate wireless communication components. Communication module 112 may also be configured to interface with a wired network and/or device via a wired communication component, such as an Ethernet interface.

User interface 114 provides user interaction with detector 101 and may include one or more buttons, indicators (e.g., LEDs), keyboards, trackballs, knobs, joysticks, displays (e.g., a liquid crystal display, a touch-screen display), and/or other type of user interface adapted to accept user input and/or provide user feedback. In one embodiment, user interface 114 may include a power button, a vibration motor, an LED to indicate a radiation detection event (e.g., a count), and/or a speaker to provide an audible indication of a detection event (e.g., visible, tactile, and/or audible indicators). In various embodiments, user interface 114 may be used to input a variety of system configuration settings, such as stabilization/calibration parameters, as described herein. In some embodiments, user interface 114 may be used to view one or more reports, graphs, and/or other radiation detection data captured by system 100E and/or processed according to the various operations described herein.

Display 116 may be configured to present, indicate, or otherwise convey alerts, notifications, counts, dose rates, and/or other reports of radiation detection (e.g., generated by logic device 110). Display 116 may be implemented with an electronic display screen, such as a liquid crystal display (LCD), a cathode ray tube (CRT), or various other types of generally known video displays and monitors, including touch-sensitive displays. Display 116 may be suitable for presenting radiation detection data, graphs, images, reports, or other information as described herein.

Other components 118 may include various stabilization/calibration devices such as a temperature sensor/probe (e.g., a thermocouple, an infrared thermometer), an LED or laser diode (e.g., to provide a known photon source), an ambient light sensor, a voltage regulator and/or filter, a variable voltage source, and/or other types of devices that can be used to facilitate stabilization or calibration, as described herein. Sensor data from such sensors may be utilized by logic device 110 to detect stabilization/calibration parameters related to detector 101, and thereby produce more reliable reports of detecting radiation. In some embodiments, other components 118 may include a GPS, accelerometer, compass, and/or other orientation sensor capable of sensing a positions and/or orientation of PCB 105 or detector 101. Other components 118 may additionally include a power module implemented as a battery, a power adapter, a charging circuit, a power interface, a power monitor, and/or other type of power supply providing a stationary or mobile power source. In some embodiments, the power module may be adapted to provide uninterruptible power and/or power conditioning to protect continued operation of detector 101.

Figure 1F:
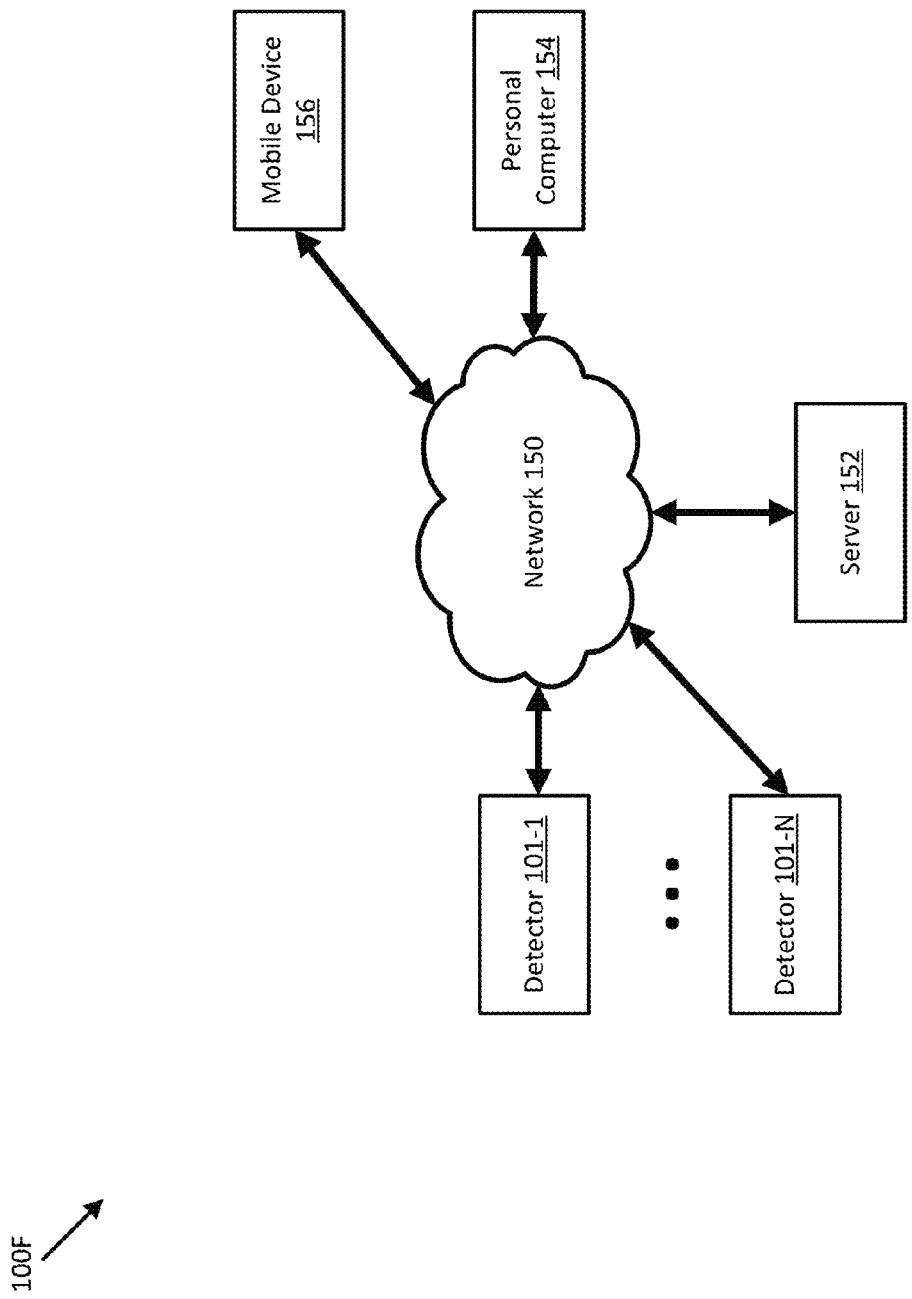
FIG. 1F illustrates a block diagram of an SiPM-based radiation detection system in accordance with an embodiment of the disclosure.

As noted above, detector 101 may form part of a larger radiation detection (e.g., and notification) system. FIG. 1F illustrates a block diagram of an SiPM-based radiation detection system 100F in accordance with an embodiment of the disclosure. As shown in FIG. 1F, detection system 100F may be a distributed form of detection system 100E, for example, including multiple detectors 101-1-n in communication with server 152 and various personal electronic devices, such as mobile device 156 and/or personal computer 154 over one or more communication links and/or network 150. In some embodiments, detectors 101-1-n may be oriented to detect radiation emitted from a single source from multiple directions, for example, or may be placed in separate locations to form a general radiation detection network. Other distributed radiation detection systems and functionalities are contemplated.

In one embodiment, mobile device 156 and/or personal computer 154 may be adapted to present a remote user interface to one or more users. A remote user interface may be adapted to display radiation detection data and/or reports generated and transmitted by detectors 101-1-n, and may be adapted to accept user input through use of a touch screen interface, a keyboard, a mouse, and/or other type of conventional user interface device, for example, as described herein. Mobile device 156 may be implemented as a mobile phone, smartphone, tablet computer, vehicle computers, and/or other mobile personal electronic device. Personal computer 154 may be implemented as a desktop computer, a fixed terminal device, a network enabled television, a home entertainment center, and/or other relatively stationary personal electronic device.

In some embodiments, network 150 may represent a WAN, LAN, and/or other network and/or combination of networks, including the Internet, and detectors 101-1-n may be adapted to establish communication links with the various personal electronic devices directly through network 150 and/or indirectly through server 152. In other embodiments, network 150 and the various communication links may represent an ad-hoc wireless and/or wired network, a proprietary network, and/or a mixed network, and detectors 101-1-n may be adapted to establish a variety of types of communication links with the various devices of detection system 100F.

In various embodiments, server 152 may be a host or other type of networked computer or distributed group of networked computers implemented as at least part of a detection and/or notification system. In some embodiments, server 152 may be adapted to receive radiation detection data from detector 101-1 and then selectively report corresponding detection data to networked devices. For example, server 152 may be adapted to distribute one or more notifications or reports transmitted by detector 101-1 to other devices (e.g., mobile device 156 and/or personal computer 154) and/or users.

In further embodiments, data may be distributed among detectors 101-1-n and/or other devices in system 100F, for example, to provide detector arrangements adapted for more complex coincidence processing (e.g., processing dependent on a spatial distribution of detectors), to allow one detector or a subset of detectors to perform data collection functions, to suppress alarms for sources known to be present (e.g., medical sources/patients), and/or other modes of operation.

Each of the detection systems described herein operate according to and can be characterized by certain performance criteria. Performance criteria for a detector assembly (e.g., a scintillator coupled with an SiPM) may include: (1) usage percentage of SiPM pixels for a single event; (2) gain/cross talk convolution in the SiPM; (3) optical coverage area of the SiPM on the attached scintillator; (4) light output of the attached scintillator; (5) light decay time of the attached scintillator; and (6) absolute efficiency/sensitivity (size) of the attached scintillator.

Usage percentage refers to the ratio of the number of pixels of the SiPM that are in a recovery state to the total number of pixels in the SiPM. For example, in some embodiments, the recovery time is 150 ns or less for each pixel in an SiPM. In various embodiments, the recovery time can be in the range from 10 ns to 150 ns or 10 ns to 300 ns, for example, and can be selected according to a desired operational mode through use of different techniques to form the silicon structure of the SiPM, through use of different bias voltages, through use of different decay constants for a bias voltage supply, and/or through variation of other operational properties of the SiPM. The recovery time may be defined as the time period it takes a pixel to recover from a breakdown condition (e.g., caused by an incident photon) and charge back to its initial bias state. In some embodiments, the recovery time may be the time in which a bias voltage for a pixel drops below the pixel's breakdown voltage and charges back to an initial bias voltage level (e.g., the pixel acts as a charging capacitor).

During an initial portion of the recovery time, while the pixel is below the breakdown voltage, the pixel is unable to respond to a subsequent event. During a later portion of the recovery time, while the bias voltage is at or above the breakdown voltage, subsequent events may register, but at a lower amount of charge (e.g., resulting in smaller amplitude output signal) due to the lower pixel/capacitor charge state. In high count rate environments, or where a coupled scintillator is a high light-output scintillator, a relatively long recovery time will lead to low-energy bias tailing in the SiPM. Thus, it is advantageous to build a detector assembly (scintillator with SiPM(s)) that does not trigger too many pixels per event, but still provides enough signal to reliably register events over any expected electronic noise. In typical operation, a desired usage percentage can be between 15 and 20%, and the geometries of the SiPM, scintillator, and/or optical guide(s) can be selected to facilitate the desired usage percentage. In some embodiments, usage percentage can vary in inverse proportion to recovery time, for example, and a desired usage percentage can range between 30% and 50% (e.g., for SiPMs with very short recovery times) without significant risk of bias tailing.

In an SiPM, the gain and pixel-pixel cross talk is related. Gain is related to the bias voltage by the equation:

$$G = \frac{C_{Pixel}(V_{Bias} - V_{BR})}{e}$$

where $C_{Pixel}$ refers to the capacitance of an individual pixel, $V_{Bias}$ is the applied voltage, $V_{BR}$ is the breakdown voltage (e.g., typically 24.5V), and e is the charge of a single electron. For further discussion of the development of the various equations herein see Licciulli F., et al. "A Novel Technique for the Stabilization of SiPM Gain Against Temperature Variations" IEEE Transactions on Nuclear Science, Vol. 60 (April 2013) pp. 606-611. The difference of $V_{Bias}$ and $V_{BR}$ is the important parameter for the gain as the rest of the parameters are dependent on fixed material properties.

As the bias voltage increases, the probability of an avalanche increases, and the charge stored in each pixel is higher; thus, when the discharge occurs, there are more electrons capable of causing photons to be released from the electron-electron interactions within the silicon. These photons can migrate outside of the initial pixel and propagate through the silicon. Since the avalanche probability is higher, the lower energy migrating photons can cause avalanches in adjacent pixels that are not initiated by a photon from an attached scintillator, which is termed cross talk. High incidences of cross talk typically lower the possible upper range/upper count rate of the detector assembly. Therefore, it is advantageous to build an SiPM array such that the gain does not need to be too high to overcome electronic noise, but allows for sufficient overhead for the upper range. Upper range/upper count rate is typically related to the expected or desired operational mode. For example, small, pager sized devices will have smaller scintillators with lower sensitivity, but can be expected to reach high rates, while larger devices will most likely contain larger scintillators with much higher sensitivity, but may not be able to reach high rates due to their physical limitations. In some embodiments, an upper range/upper count rate can be approximately 10 mR/hr, such as for a relatively sensitive scintillation instrument. In other embodiments, an upper range/upper count rate can reach up to approximately 10 R/hr, such as for an instrument analogous to a Geiger counter. Other upper ranges/upper count rates are contemplated, such as for specific scintillator volumes and/or expected radiation environments, for example, and may include selectable upper ranges/upper count rates between 1 mR/hr and 10 mR/hr, 10 mR/hr and 1 R/hr, 1 R/hr and 10 R/hr, and/or other ranges, for example.

Light output of a scintillator is a major contributor to the usefulness of the scintillator, and it affects the operation of a coupled SiPM in several ways. Table 1 presents properties of select scintillators. High resolution scintillators generally have a high light yield within a small emission range and sufficient density/Z-value for high intrinsic efficiency (probability of interaction with incident photons). For very bright scintillators, it may be necessary to disperse the light from the scintillator across several SiPMs to keep the usage percentage for each SiPM low.

TABLE 1

Properties of common scintillators

| Scintillator | Wavelength Emission (nm) | Light Yield (photons/keV) | Density | Decay Time (ns) | Hygroscopic | Resolution at 662 keV (%) |
| --- | --- | --- | --- | --- | --- | --- |
| NaI(Tl) | 420 | 38 | 3.67 | 230 | Yes | 6.0 |
| LaBr$_3$(Ce) | 380 | 63 | 5.1 | 16 | Yes | 2.8 |
| CsI(Tl) | 550 | 54 | 4.51 | 930 | Yes | 5.7 (Si) 7.4 (PMT) |
| SrI$_2$(Eu) | 430 | 90-110 | 4.55 | 1200 | Yes | >2.0 |
| BGO | 480 | 8-10 | 7.13 | 300 | No | 9.0 |
| PVT | 425 | 10 | 1.023 | 2.1 | No | None |

Light decay time of the scintillator affects the usage percentage as it relates to the recovery time of the pixels. With each pixel having a recovery time of ~150 ns, scintillators with decay times longer than this will allow for recovery of the pixels, and a smaller average usage percentage. The following examples of combinations are given:

TABLE 2

Scenarios of scintillator-SiPM combinations

| Scenario | Light Yield | Decay Time | Number of SiPMs | Sufficient for usage? | Reason |
| --- | --- | --- | --- | --- | --- |
| 1 | High | Short | 1 | No | Too many pixels saturate, limiting upper range of detection |
| 2 | High | Long | 1 | Yes | Long decay time may compensate for scintillator brightness |
| 3 | High | Short | Multiple | Yes | Photons distributed over more pixels lowers usage percentage |

TABLE 2-continued

Scenarios of scintillator-SiPM combinations

| Scenario | Light Yield | Decay Time | Number of SiPMs | Sufficient for usage? | Reason |
|---|---|---|---|---|---|
| 4 | Low | Short | 1 | Yes | Usage percentage may allow for a reasonable upper range of detection |
| 5 | Low | Long | 1/Multiple | Maybe | Depending on the signal to noise ratio, this may not be sufficient for spectroscopic operation, but could offer a very high upper range of detection |

The size of the optical readout (e.g., PMT, SiPM) in relation to the scintillator adds a layer of complexity for the detector assembly. A traditional heuristic is that the cross-sectional size of a readout is larger than the cross-sectional size of a coupled scintillator. Due to its emission wavelength and index of refraction, NaI(Tl) is able to tolerate some mismatches in size between the readout and detector without significant light/resolution loss, while other scintillators (LaBr3 and others) are very intolerant of mismatches despite similar light wavelengths. Thus, it is typically important to match an SiPM surface area to its coupled scintillator, or provide a means (a light guide or tapered crystal) to match the scintillator's optical interface to the SiPM surface area. It is contrary to good practice to leave surface areas of a scintillator uncovered or without either a reflector or some form of an optical interface to a readout. Thus, all scintillator surface area should either be covered by a reflector (e.g., if possible with thick diffuse reflector materials such as PTFE and/or Gore DRP™) or covered by properly size-matched SiPM array. In some embodiments, the area of an SiPM array (e.g., number or size of SiPM chips) should be increased to match the scintillator surface area, such as when such an increase is warranted electrically or economically.

Absolute efficiency and sensitivity are typically linked terms/performance criteria. Absolute efficiency of a scintillator may be determined, at least in part, by the average Z-value (e.g., average number of electrons/protons per atom of the scintillator material) and density, and can be defined as the ratio of photons (e.g., radiation quanta) that interact with the scintillator to the number of photons emitted from the source. Absolute efficiency should be contrasted to intrinsic efficiency, which can be defined as the ratio of the number of gammas that interact with the scintillator to the number of gammas that could have interacted or entered the scintillator volume. It should be understood that absolute efficiency can be rated for any particular type of ionizing radiation quanta that interacts with a selected scintillator.

Sensitivity is commonly given as the number of counts per unit time per unit dose to the detector (cps/µSv). For radiation detection purposes, it is advantageous to maximize the absolute efficiency and sensitivity. However, when using an SiPM, this will convolute with the light yield and decay time to determine the upper limit/upper range/upper count rate of detection of the detector assembly. Coupling too large a scintillator will provide too much sensitivity to a small SiPM array and the SiPM's upper range/upper count rate will be limited, while too small a detector will give poor sensitivity but a very high upper range/upper count rate.

A brief description of the physical phenomenon of Compton scattering (incoherent scattering) is given as a description of the following equation:

$$E' = \frac{E}{1 + \left(\frac{E}{mc^2}\right)(1 - \cos\theta)}$$

A high energy photon E (e.g., a gamma), interacts with an atom causing an electron, $mc^2$, of some energy to be emitted along with a scattered photon E' of lower energy. The angle θ of the scattered photon E' is proportional to the energy of the incident photon energy. The electron's energy is fully deposited locally in a scintillator as electric field effects have high stopping power for charged particles, and a second scintillator may detect the second, scattered photon in an attempt to determine the full energy of the gamma or the direction towards the radiation source. If energies in both detectors are combined, the sum is equal to the incident gamma energy. In the equation, there is no accounting for the azimuthal angle, only the rotational, so a probability cone may be produced when the equation is rearranged. This allows the direction towards a source to be known or at least approximated.

Gross Counter/Calorimeter

Figure 2:
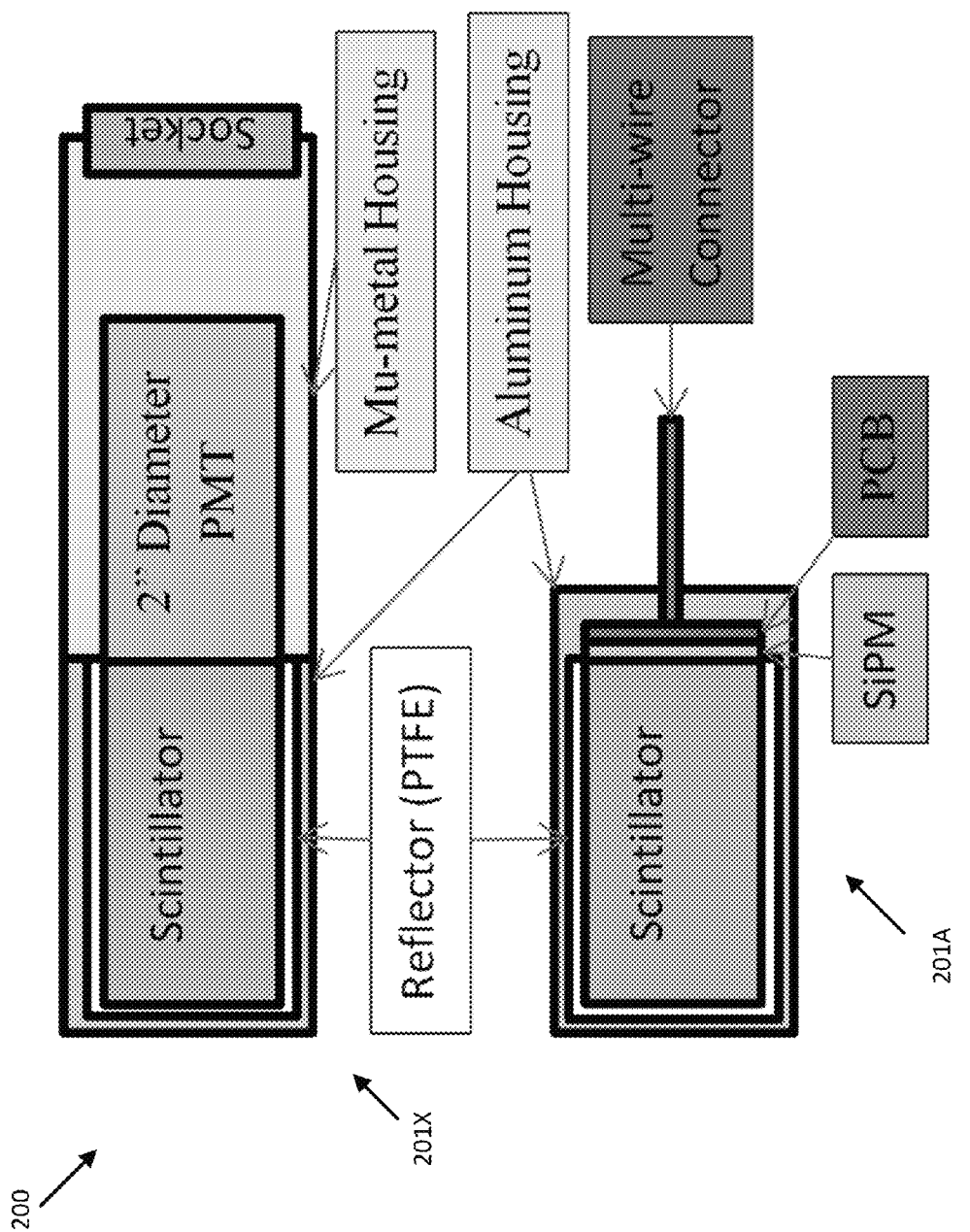
FIG. 2 illustrates a block diagram of an SiPM-based radiation detection system in accordance with an embodiment of the disclosure.

A basic application of an SiPM-based radiation detector is to emulate a standard large volume scintillator connected to a single PMT, as shown in FIG. 2. Large volume scintillators offer better sensitivity and high energy response (isotopes with high energy gammas) than smaller scintillators, and are commonly used in conventional PMT-based detectors. Conventional PMT-based detectors are sensitive to mechanical shock, vibration, magnetism, RF, and moisture ingress, and require high voltage dividers, tube sockets and tube bases.

The basic structure of a PMT-based detector is a reflector-wrapped scintillator (PTFE or Teflon™ tape around NaI(Tl)) attached to a PMT by some optical coupling material. The scintillator portion is then encapsulated in an aluminum can that makes a hermetic seal to the PMT (not shown exactly in the drawing). A mu-metal tube is placed over the PMT to provide magnetic and RF shielding, with a relatively large socket at the end with the flying leads from the PMT let through the pins and soldered in place.

The general structure of a corresponding SiPM design includes one or more SiPM chips positioned on a PCB (see FIG. 1) and attached to the reflector-wrapped scintillator with an optical coupling material. The detector assembly is then positioned in an aluminum can and given a hermetic seal to protect against moisture ingress. The only connector out may be a relatively narrow multi-conductor wire that, in some embodiments, may contain a ground, voltage for amplifiers, microcontrollers, regulators, filters, and other devices, digital signal lines, and one or more analog outputs from the SiPM array. Modifications to the design may include a beryllium window to allow x-ray or low energy gamma detection, an optical light guide to mount a larger scintillator surface area to a smaller surface area SiPM array, a radiation source for stabilization, or other variations. Variations for ruggedness can include a spring loaded scintillator in the cap to aid the optical coupling during shock. With this design, operation of a conventional gross counting scintillator detector is replicated in functionality by a smaller, cheaper design.

Compton Suppression

In general, an SiPM-based radiation detector may include any number of perspective-segregated "logical" detectors, where detection signals from the logical detectors may be combined to enable a particular operational mode, as described herein. In some embodiments, each logical detector may be implemented as a separate detector assembly, i.e., with its own scintillator and SiPM. In other embodiments, the logical detectors may be implemented as a single scintillator coupled to subsets of SiPM pixels corresponding to each logical detector. For example, an SiPM array or chip coupled to a single scintillator may be partitioned into groups or patterns of SiPM pixels, where each group or pattern of pixels corresponds to a logical detector that may be operated substantially independently of other logical detectors. Radiation detectors with SiPM-based logical detectors that are adapted to use a single scintillator may be implemented much more compactly than embodiments using multiple scintillators and/or PMTs. Furthermore, the shapes of the groups or patterns of SiPM pixels may be selected or adjusted programmatically on a pixel-by-pixel basis to enable a particular operational mode of the constituent radiation detector.

Figure 3:
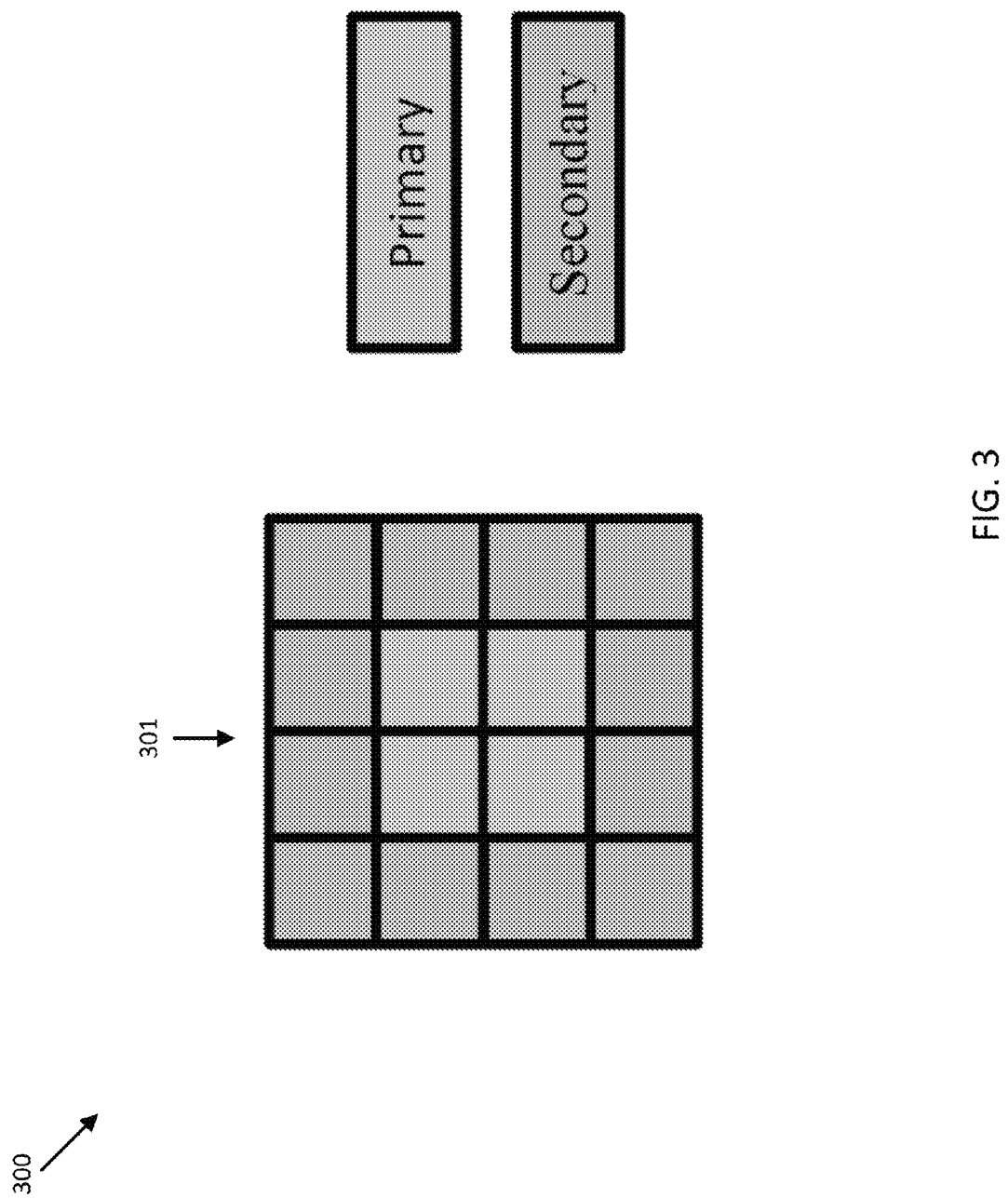
FIG. 3 illustrates a block diagram of an SiPM-based radiation detection system in accordance with an embodiment of the disclosure.

For example, one operational mode enabled by a selected group or pattern of SiPM pixels/chips is an anti-Compton shield mode, illustrated by the front-view detector assembly shown in FIG. 3. FIG. 3 illustrates a block diagram of an SiPM-based radiation detection system in accordance with an embodiment of the disclosure. Specifically, FIG. 3 depicts a geometric example of a 4×4 square array of groups of SiPM pixels/chips that include at least two logical detectors. In the embodiment shown in FIG. 3, a primary detector includes the center 4 groups of SiPM pixels/chips acting as a single logical detector, and a secondary detector includes the 12 groups of SiPM pixels/chips on the external regions that enclose the center, also acting as a single logical detector. In various embodiments, each group or each logical detector may be coupled to its own scintillator, for example, or the entire array may be coupled to a single scintillator. In alternative embodiments (e.g., when used as a gross counting detector) all 16 groups can be combined into one logical detector where all events are summed together.

In one embodiment, the anti-Compton shield mode is characterized as a process that excludes events (e.g., from recorded events) where the incident gamma enters one of the logical detectors, deposits some energy, and subsequently emits a second lower-energy gamma that is then either fully or partially absorbed in the other logical detector. This exclusion process helps clarify the photopeaks in a gamma signature that can be used to identify a radiation source. In some embodiments, the exclusion process may be performed using high-purity germanium (HPGe) detector and bismuth germanate (BGO) or cesium iodide (CsI) scintillators as a primary detector, for example, coupled with one or more SiPMs used as a relatively low cost secondary detector.

Figure 4:
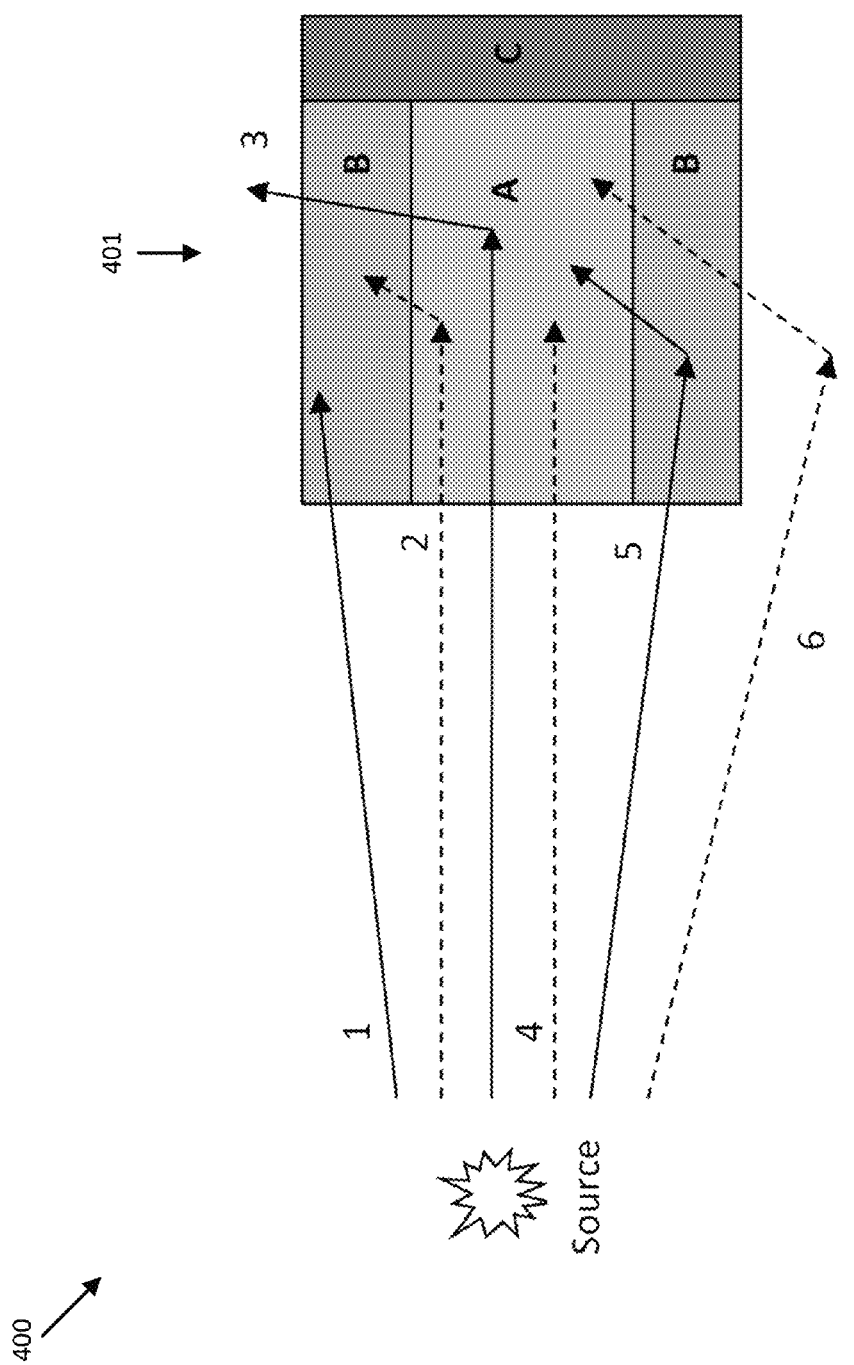
FIG. 4 illustrates a block diagram of an SiPM-based radiation detection system in accordance with an embodiment of the disclosure.

FIG. 4 illustrates a block diagram of an SiPM-based radiation detection system in accordance with an embodiment of the disclosure. Specifically, FIG. 4 is a side cross section of the detector assembly of FIG. 3, and illustrates six possible events in the context of primary detector A, secondary detector B, and SiPM readout C, where SiPM readout C is logically partitioned into 16 groups as illustrated in FIG. 3.

In event 1, a gamma ray from an external source enters secondary detector B only. Event 1 is not scored/accumulated in the identification spectrum (e.g., the energy spectrum of recorded events) because it cannot be determined whether the gamma deposited all or just a portion of its energy in secondary detector B. This potentially reduces absolute efficiency/sensitivity, but also helps suppress the Compton continuum contribution to the identification spectrum (e.g., the portion of the identification spectrum to the left of the peak at approximately 650 keV in FIG. 5).

In event 2, a gamma ray from the external source enters primary detector A and interacts through a Compton scattering event that deposits some energy in primary detector A. The scattered lower energy gamma exits into secondary detector B and deposits some or all of its energy. Event 2 triggers both logical detectors, and a logical discriminator (not shown in FIG. 4) may be adapted to prevent the data associated with event 2 from being scored/recorded in an identification spectrum. This suppresses the Compton continuum contribution to the identification spectrum.

In event 3, a gamma ray from the external source enters primary detector A and interacts through a Compton scattering event that deposits some energy in primary detector A. The scattered lower energy gamma exits the assembly without further interaction in any detector. Although it cannot be determined whether the gamma deposited all or just a portion of its energy in primary detector A, event 3 is scored in the identification spectrum as part of the Compton continuum that cannot be suppressed without also suppressing a substantial number of non-Compton continuum detection events. Furthermore, because primary detector A is concentrically surrounded by secondary detector B, a substantial portion of the Compton continuum associated with primary detector A can be suppressed, and so event 3 can be scored with less risk of negative impact on the identification spectrum than if, for example, event 1 were scored.

In event 4, a gamma ray from the external source enters primary detector A and deposits all its energy. Event 4 is scored in the identification spectrum and contributes to the portion of the identification spectrum that can be used to identify a radiation source.

In event 5, a gamma ray from the external source enters secondary detector B and interacts through a Compton scattering event that deposits some energy in secondary detector B. The scattered lower energy gamma exits into primary detector A and deposits some or all of its energy. Event 5 triggers both detectors, and a logical discriminator may be adapted to prevent the data associated with event 5 from being scored in the identification spectrum. This suppresses the Compton continuum contribution to the identification spectrum. Typically, event 5 is indistinguishable from event 2 as the time of flight of the scattered gamma is negligible at short distances.

In event 6, a gamma ray from the external source interacts through a Compton scattering event outside of the detector assembly, and the scattered lower energy gamma enters primary detector A and deposits all of its remaining energy. This event is scored in the identification spectrum as part of the Compton continuum that cannot be suppressed without also suppressing a substantial number of non-Compton continuum detection events, similarly as described with respect to event 3. Typically, event 6 is indistinguishable from events 3 or 4 due to the short time of flight of the scattered gamma.

Figure 5:
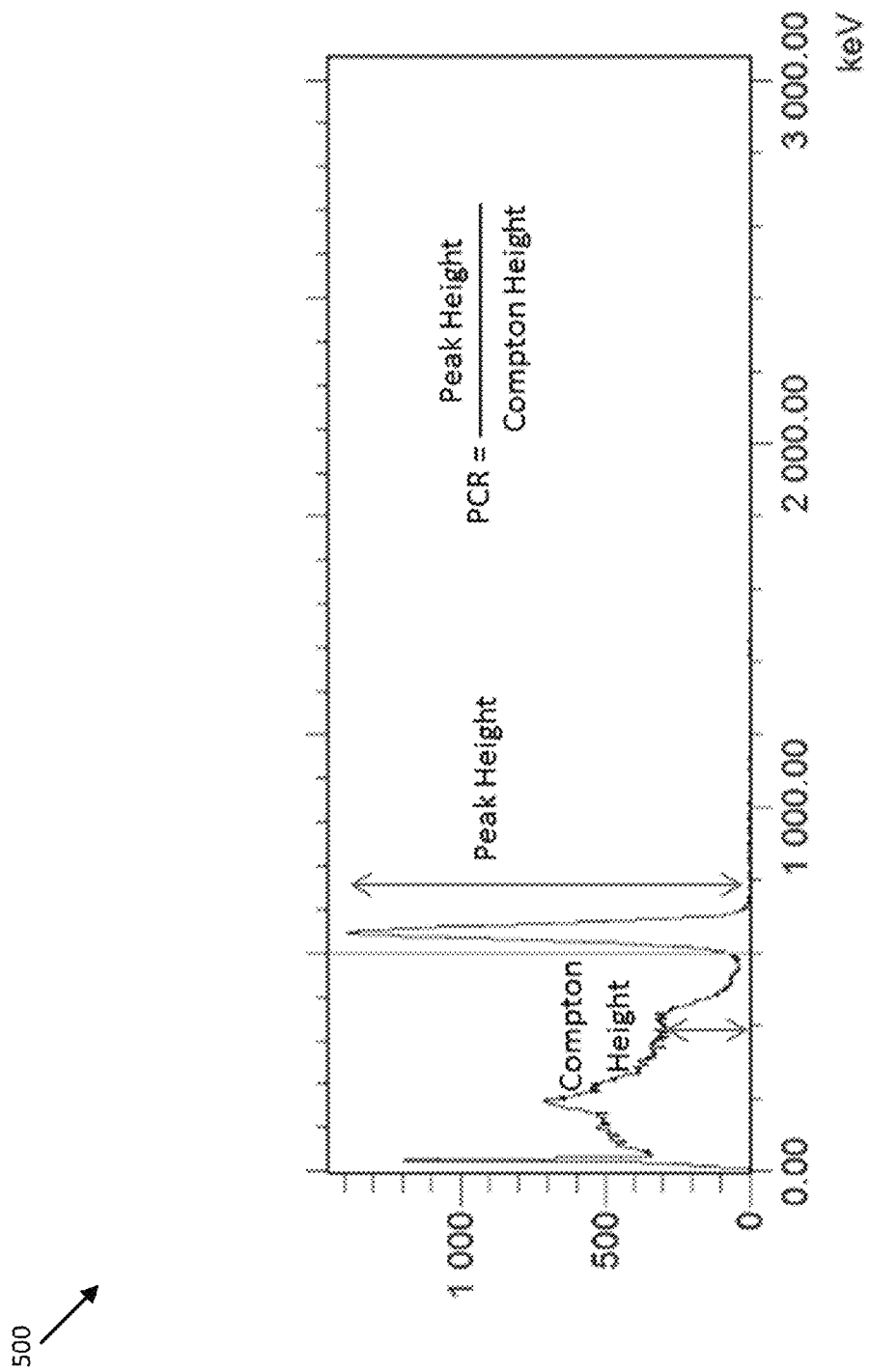
FIG. 5 illustrates an identification spectrum in accordance with an embodiment of the disclosure.

The purpose of the anti-Compton shield mode is to maximize the peak-to-Compton ratio (PCR, somewhat analogous to signal to noise ratio). For example, FIG. 5 illustrates the ratio of the height of the Cs-137 full energy peak at 662 keV to the height of the Compton continuum below 477 keV. By reducing the scored amount of Compton scatter into and out of primary detector A, the ratio increases, allowing for greater fidelity of full energy peaks.

Conventionally, similar instruments exist as large-scale laboratory-based designs that cannot be easily transported or ruggedized for widespread usage. SiPM-based radiation detector embodiments that include configurable logical detectors are: relatively compact, inherently ruggedized, relatively inexpensive to manufacture, do not require expensive and heavy magnetic shielding, do not require high voltage circuitry, are scintillation-based radiation detectors, and are easily reconfigurable, even during operation, so that they may be used in anti-Compton shield mode for identification tasks in addition to being used for more standard detection tasks.

In some embodiments, a similar arrangement of logical detectors may be used to improve operation of and reduce manufacturing costs for collimated radiation detectors that include lead or tungsten shielding around their scintillator(s) in an attempt to fully absorb gammas entering from the sides or back of the radiation detector.

Directionality

Compton scattering is one mechanism to determine the direction towards a radiation source. By positioning multiple detector assemblies and/or logical detectors in close proximity and coupling them to coincidence circuitry, Compton scattering events between any two detectors may be utilized to determine a general direction towards a radiation source. An example of a detector array in such an operational mode is shown in FIG. 6.

Figure 6:
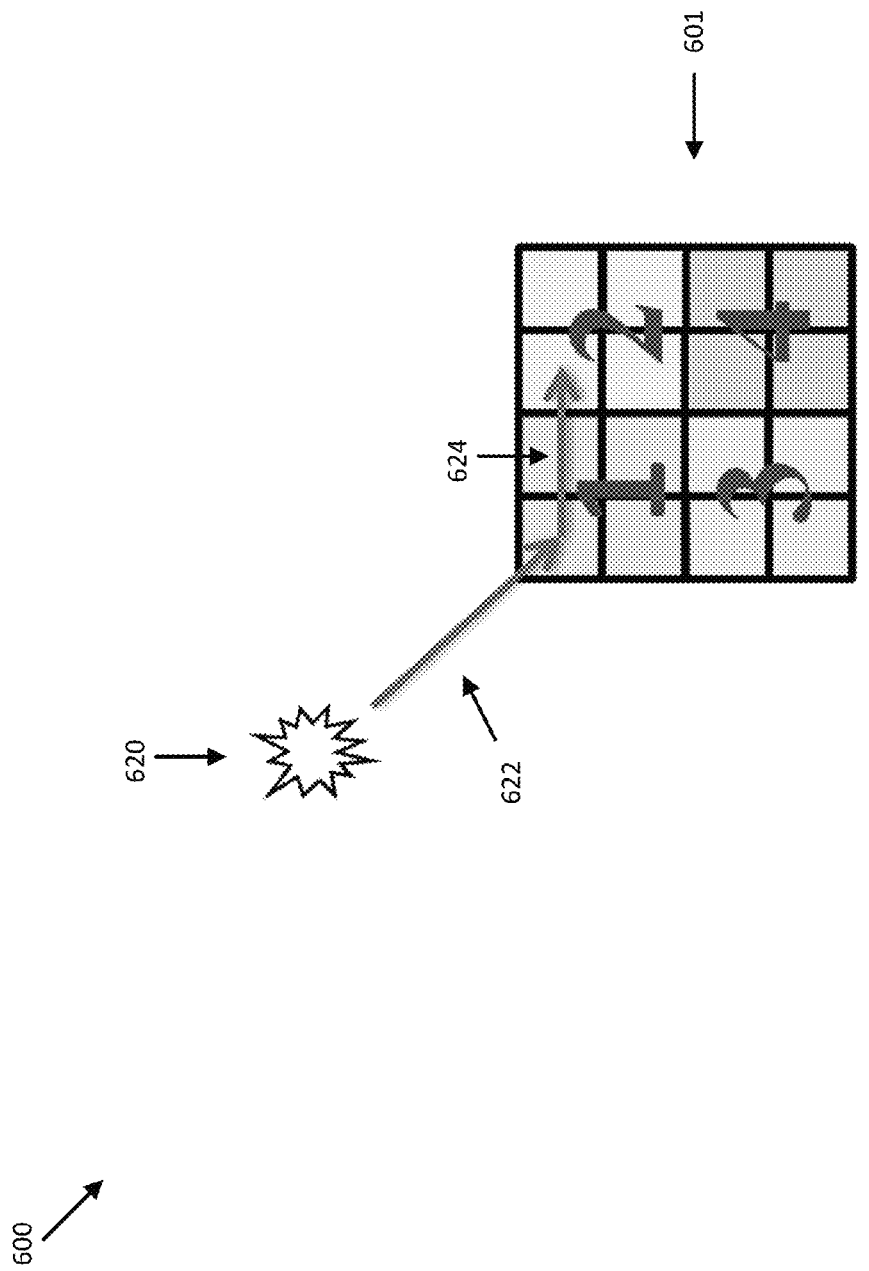
FIG. 6 illustrates a block diagram of an SiPM-based radiation detection system in accordance with an embodiment of the disclosure.

FIG. 6 illustrates a block diagram of an SiPM-based radiation detection system in accordance with an embodiment of the disclosure. In the embodiment shown in FIG. 6, a directionality mode partitions a square grid array into quadrants that are treated as 4 separate detector assemblies/logical detectors. Coincident events between any two quadrants would cause a signal processor/microprocessor receiving the events to determine the angle of the incident gamma based on the energy and timing responses of the two events. The signal processor/microprocessor may be adapted to construct a map of angles of incidence over many events, for example, and combine the data with timed responses from a GPS, compass, and/or accelerometer to determine an absolute direction towards a radiation source and indicate the absolute direction to a user. In various embodiments, an SiPM-based radiation detector in a directionality mode may be adapted to select a one, two, or three dimensional array of detector assemblies/logical detectors, or an iterative combination of these, to help construct a map of angels of incidence.

Stabilization

Device stabilization or calibration (e.g., a type of operational mode) may be defined in many different ways. The most common definition is gain stabilization, where device and/or fabrication parameters are selected or adjusted such that a specific gamma peak will present at a specific location within an energy spectrum. This form of stabilization generally refers to adjustments in bias voltage or amplifier gain. Typically, this type of gain is addressed through adjustment of a gain stabilization feedback loop. A second definition is parametric stabilization, where signal characteristics of energy resolution or noise thresholds are held constant under external thermal stress. This includes adjustments to filter coefficients, comparator thresholds, lower level discriminators, and other parameters. With an SiPM, gain stabilization is absolutely necessary for reliable operation, but optimal performance cannot be obtained without also addressing the parametric stabilization.

Gain Stabilization Feedback Loop

For compensation of peak position and temperature feedback, a generalized feedback loop may be used. In some embodiments, such feedback loop may be implemented in software, a microprocessor, and/or another type of logic device. A formula (e.g., see Licciulli) showing the gain of the SiPM is provided, where $C_{pixel}$ is the capacitance of the individual pixel, $V_{Bias}$ is the bias voltage, $V_{BR}$ is the breakdown voltage, and e is the charge of a single electron.

$$G = \frac{C_{Pixel}(V_{Bias} - V_{BR})}{e}$$

Breakdown voltage $V_{BR}$ is related to temperature by the following equation, where $V_{BR0}$ is the breakdown voltage at some initial temperature, $\beta$ is the temperature coefficient (e.g., 20 mV/° C.), and $T_0$ is the temperature at an initial saturation temperature during calibration.

$$V_{BR(T)} = V_{BR0}[1+\beta(T-T_0)]$$

Expanded, the relation of gain to temperature is given below.

$$G(T, V_{Bias}) = \frac{C_{Pixel}}{e}(V_{Bias} - V_{BR0}[1 + \beta(T - T_0)])$$

A relation for a single peak is given below, where $S_{Pixel}$ is the voltage generated by a single pixel activation in the SiPM, $N_{Pixel}$ is the number of pixels activated by some external stimulus, FG is the adjustable gain from signal processing electronics, and P is the resulting peak position (e.g., estimated energy) of the event that is a function of temperature and bias voltage.

$$P(T, V_{Bias}, FG) = S_{Pixel} \cdot N_{Pixels} \cdot G(T, V_{Bias}) \cdot FG$$

During a calibration phase, the peak position of the event is measured with the SiPM at a saturation temperature ($T_0$), constant $V_{Bias}$, and electronics gain FG set to unity, which is designated as $P_0$. The feedback loop functionality is provided as an optimization algorithm that aims to bring the value of M to 1 by adjusting $V_{Bias}$ or FG.

$$M(V_{Bias}) = \frac{P(T, V_{Bias}, FG)}{P_0}$$

Stabilization of a single element or array may be performed by identification of a persistent gamma ray peak in the energy spectrum, such as that provided by a known radiation source. A weak external radiation field from K-40, Mn-54, Cs-137, Na-22, or other isotopes provides such a persistent gamma ray peak in the background spectrum. The peak is observed with its peak position recorded as the baseline for future comparisons. As the SiPM or SiPM/scintillator combination drifts with temperature, this peak will move accordingly. A microprocessor may be adapted to track the movement of this peak and adjust the bias voltage or fine gain of the SiPM to compensate according the feedback loop.

Stabilization of a single element or array may also or alternatively be performed with a temperature probe. This may be performed by calibrating the instrument in an environmental chamber that is cycled and time saturated at various temperatures to create a map of the temperature-gain-voltage response. The temperature probe can be located between the pixels in a detector array, underneath the SiPM carrier board, or somewhere in the cavity that is in thermal equilibrium with the sensor elements, for example. As the temperature probe provides temperature data to the feedback control loop, either or both the electronic gain FG and bias voltage $V_{Bias}$ may be modified.

Signal Shape of Scintillation Decay

Stabilization of a single element or array may be performed with signal shape of the scintillation detector decay. Scintillators such as NaI(Tl), CsI(Tl), LaBr$_3$(Ce), CeBr$_3$, CLYC, and others exhibit multiple decay modes as a result of the complex band gap level structure. This structure may be affected by temperature changes, where the proportions at which the characteristic decays occur are modified, giving an apparent change in the scintillation decay time. Changes in the pulse shape are often observed when using DSP or pulse snap shots/waveform captures. An optimization algorithm utilizes the characteristics to control the feedback loop.

Multiple methods are available for collecting signal characteristics that may be utilized for identifying temperature changes. An SiPM provides an energy output (cathode signal) that provides the typical pulse waveform of a scintillator with minimal effects on pulse shapes, such that a signal processor coupled to the SiPM can retrieve a variety of signal characteristics and measurements including the rise time, pulse width, fall time, peak amplitude, pulse integration, and others. Depending on the type of scintillator, these characteristics may be utilized in an algorithm for determining the temperature of the scintillator. In cases where the SiPM is in thermal equilibrium with an attached scintillator, this temperature is also the temperature of the SiPM. Typically, an SiPM has a much smaller heat capacity than an attached scintillator.

The same SiPM may have additional capability for fast timing (AC-coupled signal between resistor and diode with pulse width <4 ns, or, in other embodiments, between 0.5 and 10 ns), where the SiPM is adapted to provide a very precise start of a pulse that may be utilized for timing only; this signal is not necessarily proportional to a gamma event's energy. The timing signal may be utilized to measure the temperature of the scintillator crystal itself based on the time differences of the pulse start time in the fast signal, and one or more pulse features of the scintillator decay.

For example, a calibration procedure may consist of temperature cycling a detector assembly in the presence of an external radiation source (e.g., Cs-137 or another) that provides a gamma peak of interest at which point only events within that gamma peak are interrogated for their signal characteristics. At various temperature stages (e.g., between a range including −20° C. to 60° C.), these signal characteristics may be measured and statistically analyzed using variable screening to determine primary effects (e.g. perturbations due to temperature). For NaI(Tl), the relationship between pulse width and temperature is known; thus, a statistical map of pulse width to temperature may be constructed, and modifications to $V_{Bias}$ or FG necessary to stabilize the signal can be provided by the known relationship and/or algorithmic interpolation.

In typical signal processing of radiation signals, a time-ordered stream of digitized signal data from an ADC may have various filter parameters applied that aim to maximize/optimize the resolution for a given gamma event energy (most commonly Cs-137 @662 keV). As the pulse shape changes (e.g., due to temperature drift), the filter coefficients may vary in effectiveness, typically decreasing the apparent resolution, adding leading or trailing edges to otherwise Gaussian peak shapes. A collection of filter coefficients that are applicable at different temperatures may be generated during a calibration process, and then selected according to a measured or derived temperature during device operation, to provide on-the-fly changes to the filters that aid in stabilization.

For example, in some embodiments, a waveform input may be compared to a desired waveform output, and filter coefficients may be adjusted to equalize the two when operating on the waveform input. To construct an algorithm to adjust the filter coefficients properly, according to the temperature dependence of the SiPMs, a map of captured waveform inputs and outputs at specific temperatures may be constructed. These waveforms may be related to an external radiation source, including Cs-137, Mn-54, Na-22, K-40, or other isotopes that may be present during device operation. In one embodiment, a radiation detector may be placed in a climate chamber and time saturated at various temperatures (e.g., between a range including −20° C. to 60° C.), where at each temperature, waveforms corresponding to events that occur within the characteristic photopeak region of interest for a selected external radiation source are stored (e.g., as inputs for the algorithm). Once the entire temperature range is defined, the algorithm may be used to generate a table of temperature dependent filter coefficients. Such a table may be used to provide on-the-fly changes to the filters that aid in stabilization, as described herein.

Stabilization of a single element or array may be performed using a combination of the above methods. An external source may be utilized effectively with both direct temperature measurement and derivation from scintillation pulse width as it provides a stable gamma peak that will aid in gain stabilization of a radiation detector. Temperature measurements obtained through direct measurement or derivation from scintillation pulse width may be utilized for filter coefficient selection to combine gain and parametric stabilization to further improve performance. For example, the temperature of an SiPM coupled to a scintillator may be determined from the derived temperature of the scintillator, either as a direct correspondence, for example, or as a function of a known temperature gradient determined through a calibration process, for example.

Fast Neutron Detection

Figure 7:
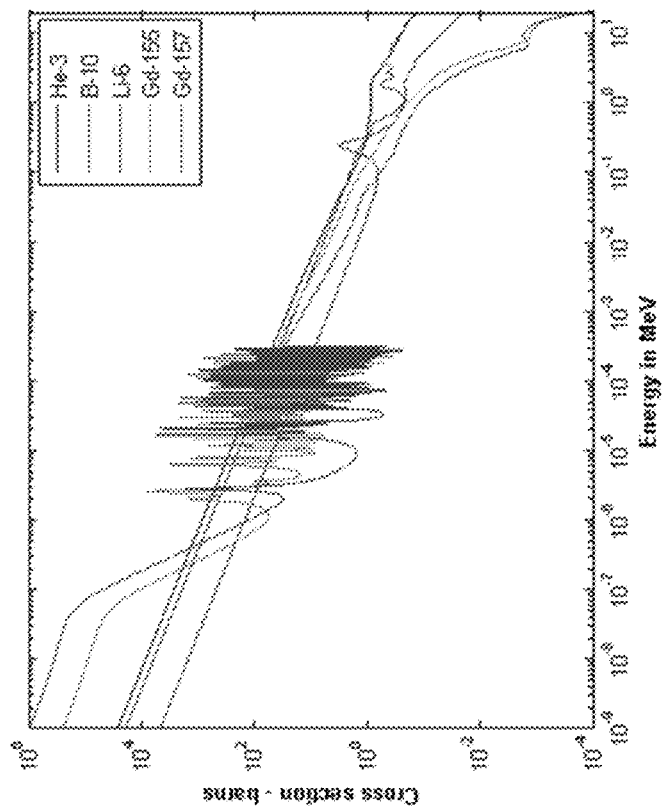
FIG. 7 illustrates various neutron absorption probabilities in accordance with an embodiment of the disclosure.

Neutrons are typically emitted in an energy distribution characteristic to a specific neutron source. For example, mono-energetic neutron sources include AmBe, PuBe, RaBe, and D-T generators. Sources that follow a Watt distribution include Cf-252, U-235 fission, and others. For industrial applications, use of a mono-energetic neutron source is common, but the high energies of the neutrons from those sources are difficult to detect as the probability of interaction decreases with increasing neutron energy. FIG. 7 illustrates this point and depicts absorption probabilities as a function of energy on a logarithmic scale. However, a second mode of detection is available through the physics of neutron scattering: proton recoil detection.

When a neutron strikes a bound hydrogen nucleus, as in the case of a liquid scintillator and some polyvinyltoluene (PVT) type scintillators (e.g., as part of a first discrete neutron detector assembly), the rigidity of the polymer chains forces the molecule to oscillate, which excites the activator sites (PPO, POPOP, etc.) that then de-excite by scintillation. In this collisional event, the neutron transfers kinetic energy but is not absorbed. A lower energy neutron is then scattered according to effectively random angular distributions. A second discrete neutron detector assembly in proximity to the first detector assembly would allow for the chance to detect the scattered neutron. The time between events would be the physical time of flight of the neutron between the two detector centroids.

Figure 8A:
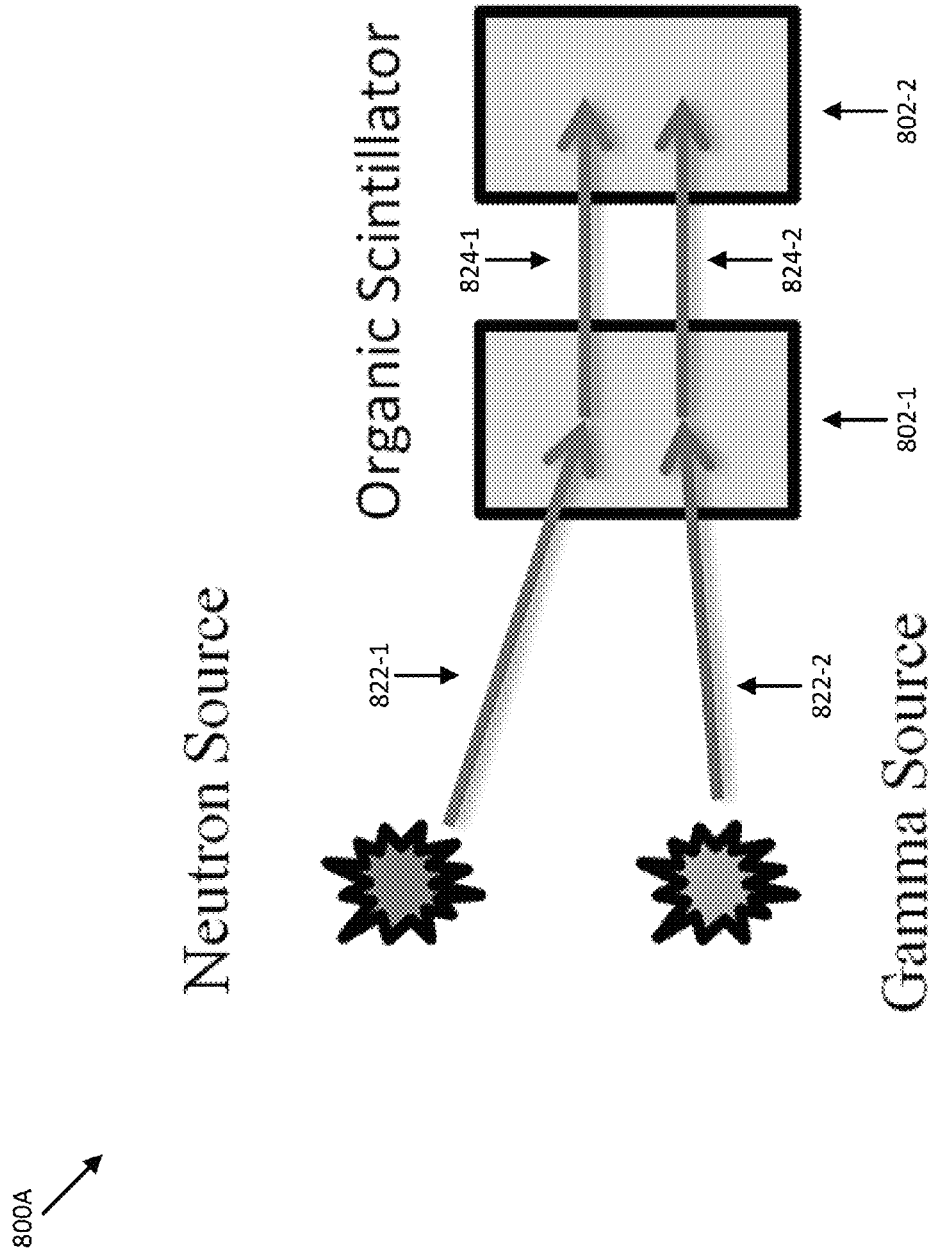
FIG. 8A illustrates a block diagram of an SiPM-based radiation detection system in accordance with an embodiment of the disclosure.
Figure 8B:
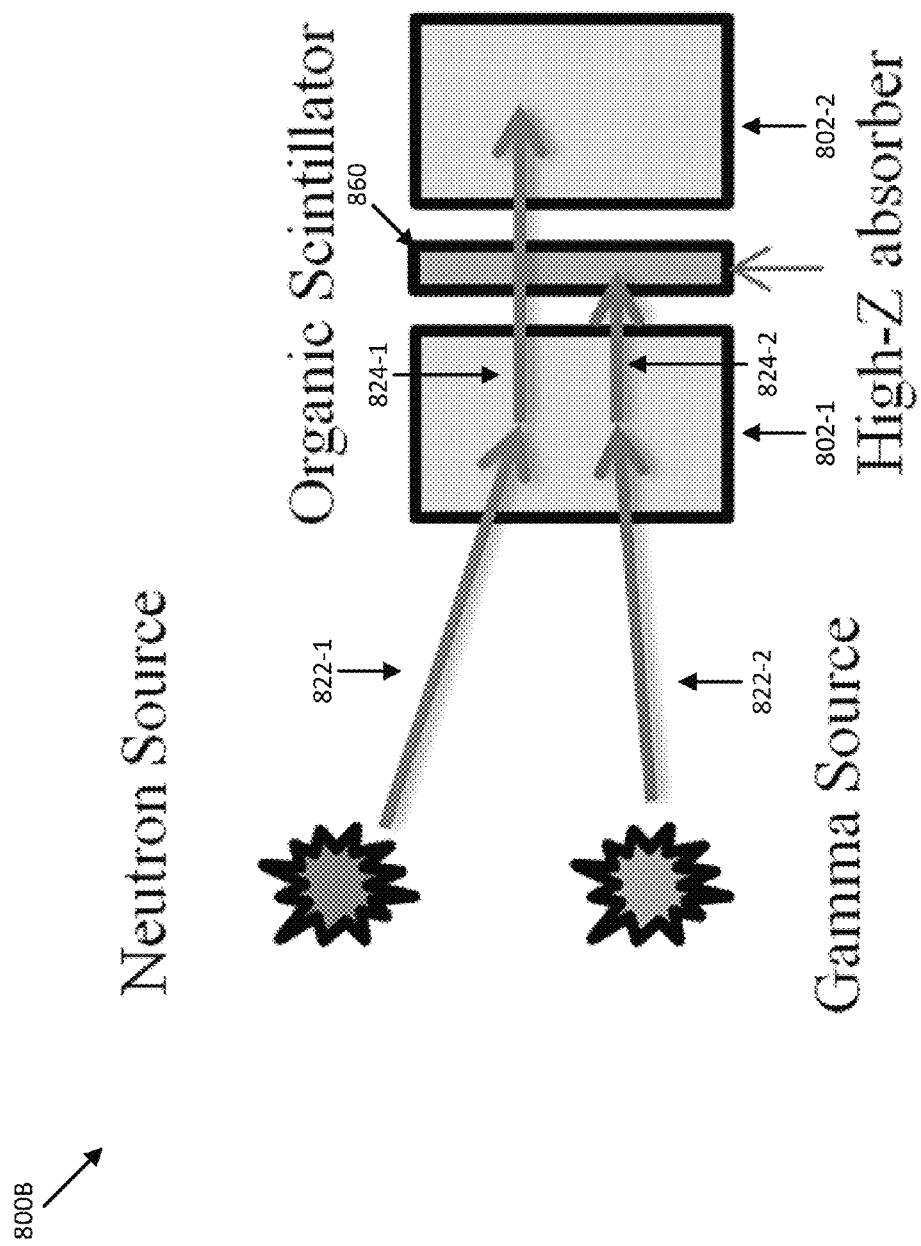
FIG. 8B illustrates a block diagram of an SiPM-based radiation detection system in accordance with an embodiment of the disclosure.

The neutron collision events do not elicit responses that are radically different from a gamma in the PVT or liquid scintillator; thus, conventional methods of neutron detection using proton recoil rely on pulse shape discrimination methods that try to identify slight differences in characteristics of resulting pulses. These conventional methods typically fail at neutron energies <250 keVee (the ee at the end refers to "electron equivalent" when looking at multiple particle types on the same scale as electrons/gammas). FIG. 8A illustrates the problem with convention experimental setups. In FIG. 8A, both gammas and neutrons can freely traverse the distance between the two scintillators. With the similarity in electronic response, it is difficult to reliably discriminate neutrons from gammas. FIG. 8B shows a similar experimental setup, but with a high-Z absorber (lead or tungsten) between the two scintillators. In FIG. 8B, the scattered gammas are attenuated by the high-Z material, while neutrons freely pass into the second scintillator, allowing for a much simpler discrimination procedure based on coincident events (e.g., corresponding to a fast neutron detection operational mode) rather than pulse shape discrimination in two detector assemblies.

When implemented with PMTs, this type of neutron detector must be very large, which can significantly skew the neutron scattering results. With the introduction of SiPMs and multichannel ADCs, this type of neutron detector can be made much smaller and more compact, allowing for better neutron-gamma discrimination based on electronic timing rather than pulse shape discrimination. An illustration of an embodiment of such a design (e.g., corresponding to a fast neutron detection operational mode) is shown in FIG. 9.

Figure 9:
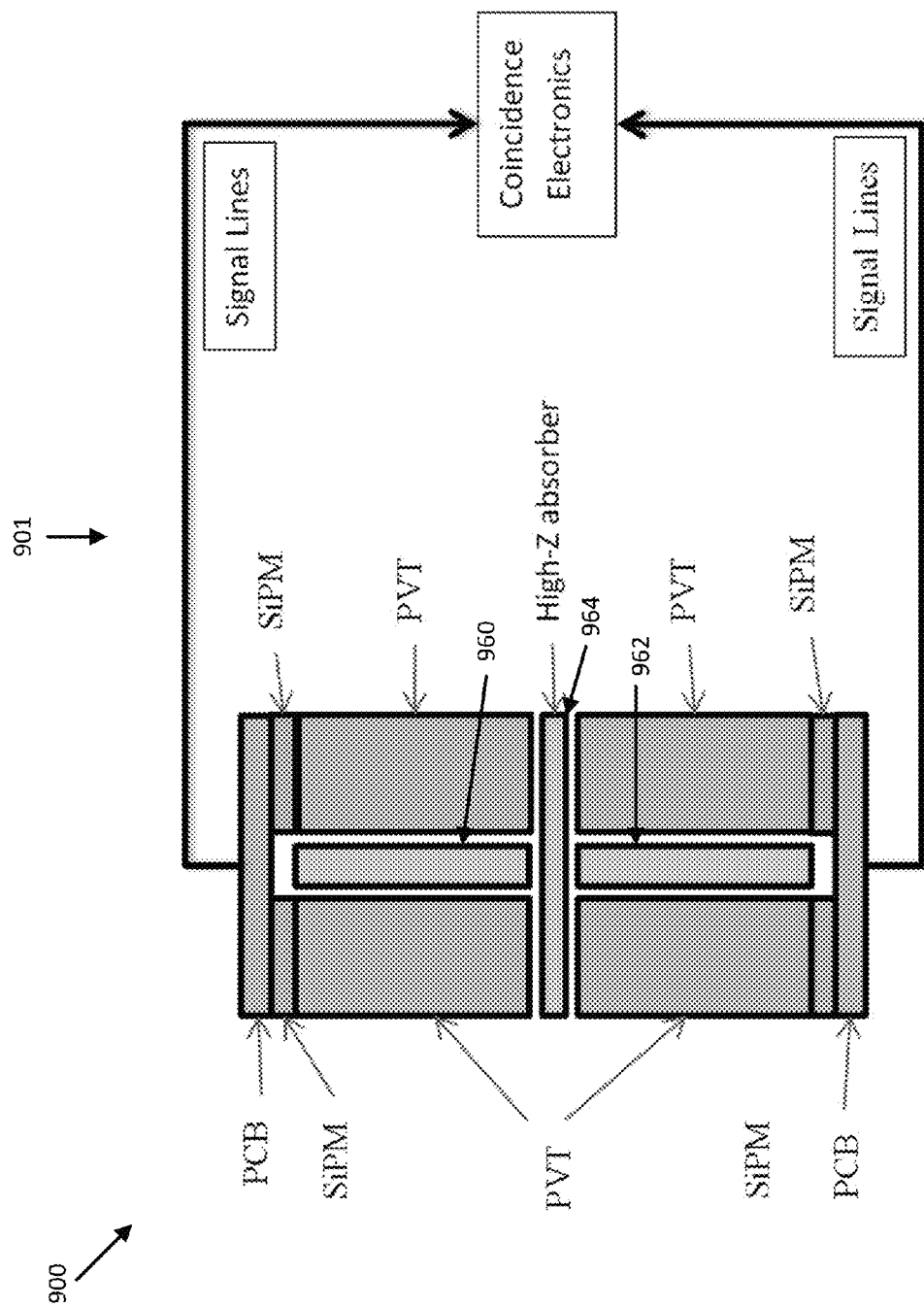
FIG. 9 illustrates a block diagram of an SiPM-based radiation detection system in accordance with an embodiment of the disclosure.

FIG. 9 illustrates a block diagram of an SiPM-based radiation detection system in accordance with an embodiment of the disclosure. In FIG. 9, 4 PVT scintillators are spatially separated by high-Z absorber material. An SiPM or array of SiPMs are connected to each scintillator, with signal information being transmitted to a set of coincidence detection electronics that can include one or more multichannel ADCs and FPGAs. The ADC may be adapted to perform simultaneous sampling of signal pulses from each of the SiPMs, for example, and a coupled FPGA may be adapted to pick out time information from a rise time of a sampled pulse. Events that occur within a very small time window (e.g., <10 ns) of each other may be deemed coincident. If the SiPM has the capability for fast timing (~4 ns wide pulses from AC coupled signal between anode and diode portion), then the fast timing signal can be used directly for the time stamps for even smaller time windows.

Integral Gamma-Neutron Detection

Gamma-Neutron detection without pulse shape discrimination (e.g., corresponding to a fast gamma-neutron detection operational mode) is possible by gamma-only means when using the principle of prompt gammas from neutron activation. When neutrons interact with an absorber material, including oxygen, gadolinium, or other neutron absorber, a multiplicity of gammas of characteristic energies may be emitted isotropically and simultaneously from the residual nucleus de-excitation. With the neutron absorber material positioned outside of the gamma detectors and placed strategically along scintillators large enough to fully capture the emitted gammas, coincident events between several gamma detectors may be indicative of a neutron capture event. SiPMs allow non-pulse shape discrimination gamma-neutron detectors to be implemented with novel geometries and absolute efficiencies that are not available with PMT-based detectors.

Figure 10:
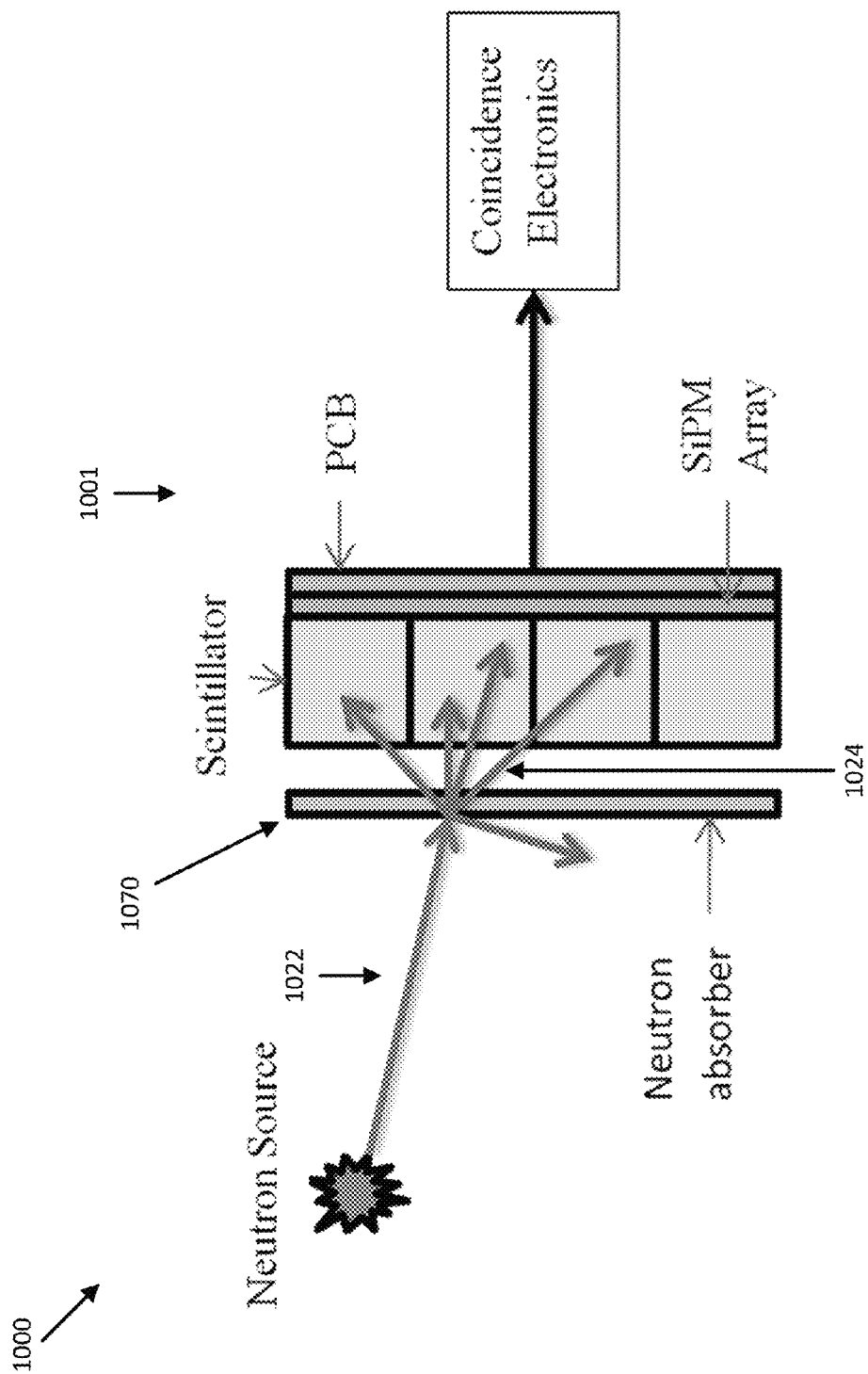
FIG. 10 illustrates a block diagram of an SiPM-based radiation detection system in accordance with an embodiment of the disclosure.

FIG. 10 illustrates a block diagram of an SiPM-based radiation detection system in accordance with an embodiment of the disclosure. Specifically, FIG. 10 shows system 1000 illustrating operation of one embodiment of a neutron detector (e.g., neutron detector 1001). For example, an incident neutron 1022 may enter the neutron absorber material 1070 and be captured by one of the absorber nuclei. As the nucleus de-excites, a simultaneous burst of gammas 1024 is emitted in many directions, with some fraction being absorbed in the scintillator material. This scintillator material may be PVT, NaI(Tl), or other materials. The scintillator captures at least some of gammas 1024 and converts them to an abundance of low energy photons that are collected by the SiPM and transmitted to coincidence electronics. Events that occur in multiple, spatially separated logical detectors would be indicative of a neutron capture event. If the SiPM is capable of fast timing, then the fast timing signal may be utilized as a trigger for use with the coincidence electronics without also requiring full signal processing (e.g., which would otherwise typically require fast ADC, DSP and/or FPGA electronics), thereby providing inexpensive non-spectroscopic neutron detection. Larger neutron detectors (e.g., with higher absolute efficiencies) may be created by connecting several detectors 1001 or arrays of detectors 1001 to common coincidence electronics.

Figure 11:
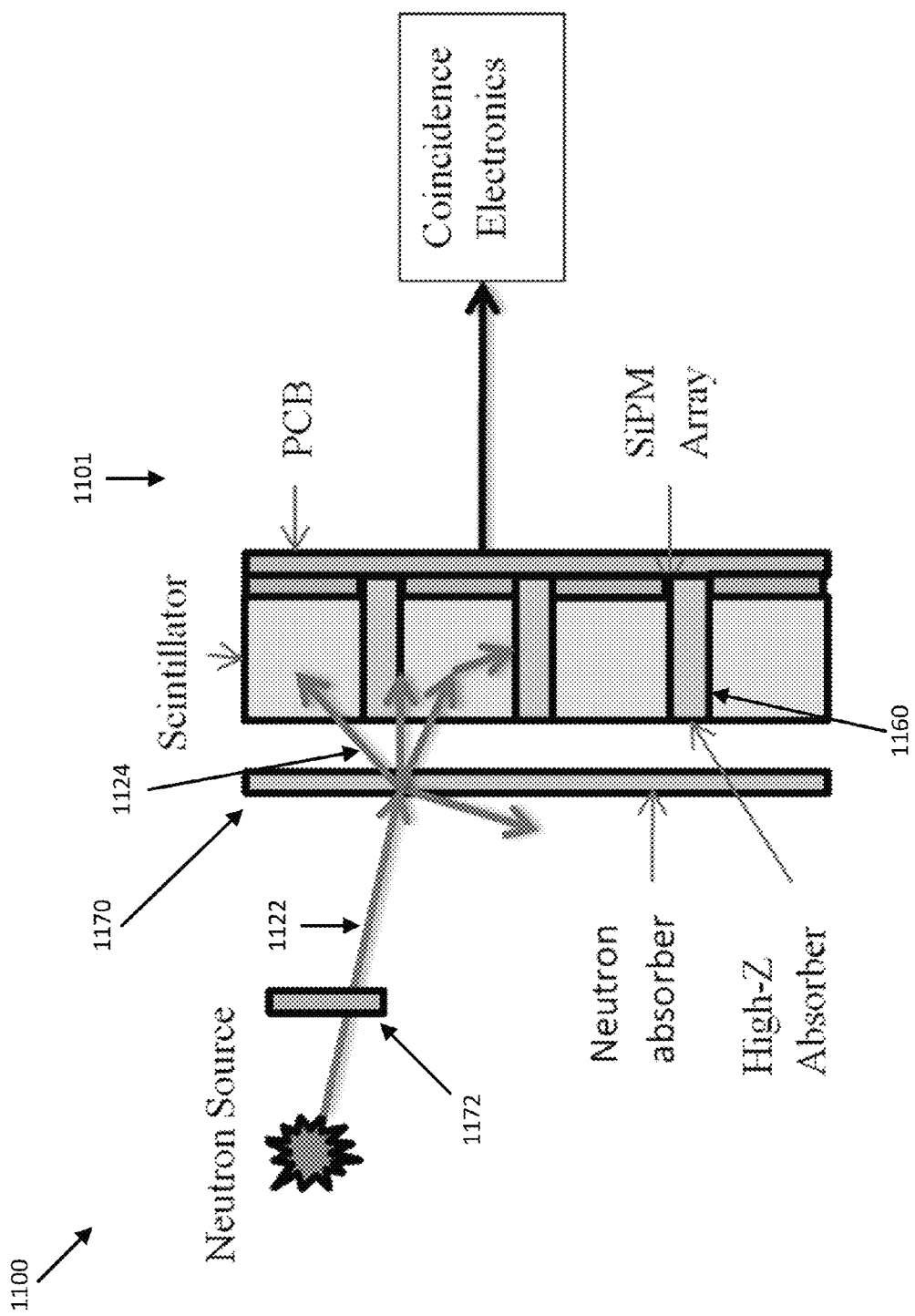
FIG. 11 illustrates a block diagram of an SiPM-based radiation detection system in accordance with an embodiment of the disclosure.

FIG. 11 illustrates a block diagram of an SiPM-based radiation detection system in accordance with an embodiment of the disclosure. Specifically, FIG. 11 shows system 1100 illustrating operation of another embodiment of a neutron detector (e.g., neutron detector 1101), which combines aspects of detector 901 in FIG. 9 and detector 1001 in FIG. 10 (e.g., corresponding to a fast Compton suppression gamma-neutron detection operational mode). For example, where gammas interact with several logical detectors at once, and where detection of Compton scattering of gammas is undesirable, it is possible to shield the regions between logical detectors, as shown in FIG. 11. An incident neutron 1122 would enter the neutron absorber material 1170 and be captured by one of the absorber nuclei. As the nucleus de-excites, a simultaneous burst of gammas 1124 is emitted in many directions, with some fraction being absorbed in the scintillator material. This scintillator material may be PVT, NaI(Tl), or other materials. The scintillator captures at least some of gammas 1124 and converts them to an abundance of low energy photons that are collected by the SiPM and transmitted to coincidence electronics. Events that occur in multiple, spatially separated detectors would be indicative of a neutron capture event. Gammas that undergo Compton scattering within the scintillator will still deposit energy in the scintillator, triggering the fast signal, but will be unlikely to traverse the high-Z absorber (tungsten, lead, etc.) 1160 and trigger an adjacent detector with the scattered, lower-energy gamma. As shown in FIG. 11, in some embodiments, incident neutron 1122 may first pass through screening material 1172 to limit or otherwise modify the neutron flux energy profile, for example, or to screen gamma or other ionizing radiation (e.g., noise sources) from detector 1101.

Gamma-Neutron detection with pulse shape discrimination (PSD) (e.g., corresponding to a pulse shape gamma-neutron detection operational mode) is also possible with SiPM-based radiation detectors. For example, plastic scintillators (polyvinyltoluene/PVT) that are capable of pulse shape discrimination (PSD) between gamma and neutron interaction may be utilized with an SiPM array and thus provide a detector that is sensitive to both gamma and neutron radiation. Fast neutrons may interact with hydrogen atoms in the PVT and cause scintillation having a pulse shape that is different from that caused by gamma interactions. In some embodiments, such detectors may be implemented to detect pulse shape and/or events using fast and slow signals simultaneously. Similar detectors implemented with PMTs typically cannot be adapted to use both fast and slow signals simultaneously.

Neutron Spectrometry

Figure 12:
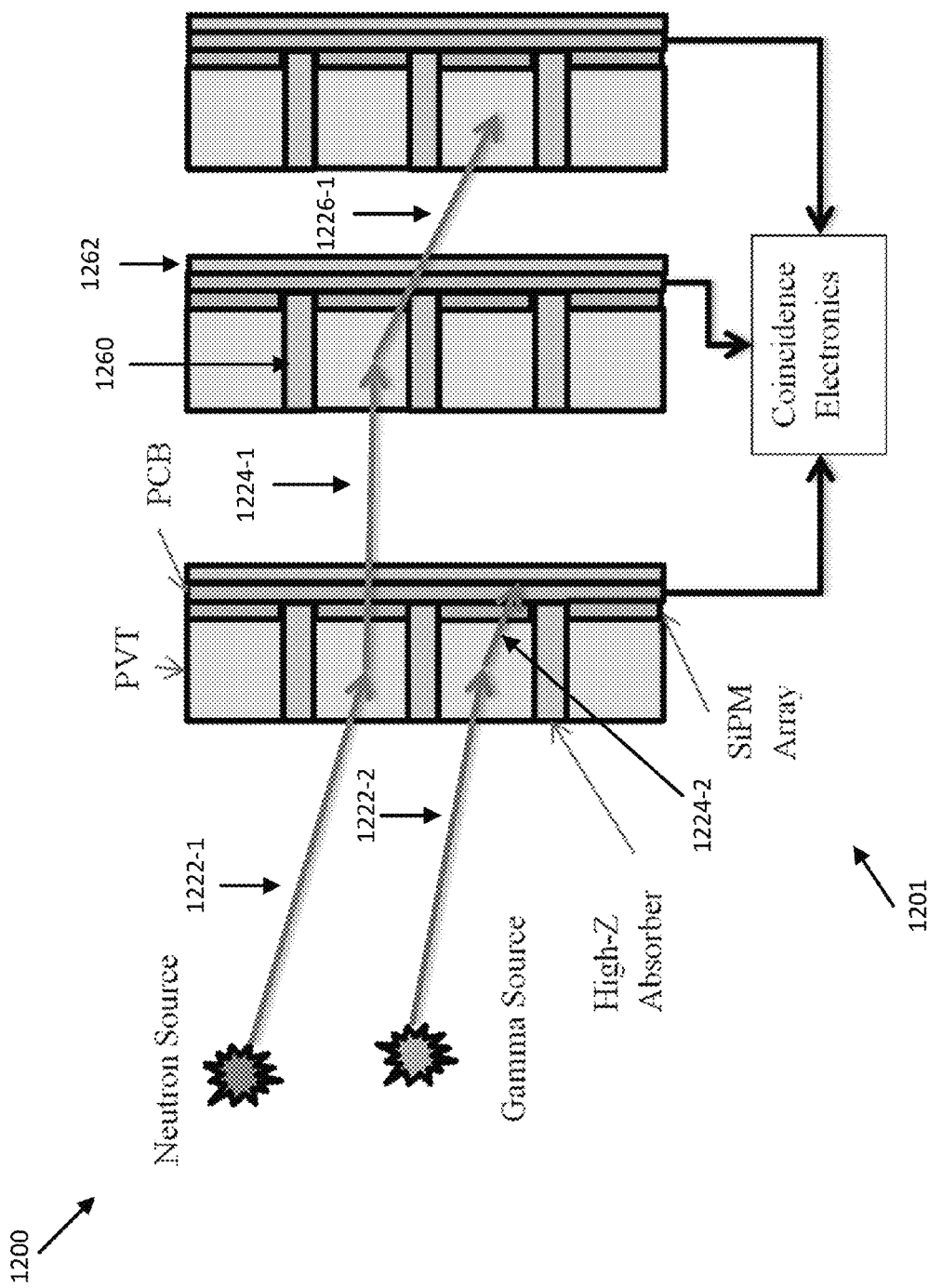
FIG. 12 illustrates a block diagram of an SiPM-based radiation detection system in accordance with an embodiment of the disclosure.

A neutron spectrometer may be implemented using a design similar to detector 1101 in FIG. 11 (e.g., corresponding to a neutron spectrometer operational mode). For example, FIG. 12 shows system 1200 illustrating operation of an embodiment of a neutron spectrometer detector (e.g., neutron detector 1201), which may be a modified form of detector 1101 in FIG. 11. For example, detector 1201 includes high-Z absorber 1260, but omits absorber 1170 and screening material 1172, and instead includes high-Z shielding 1262 between the stacked planes of logical detectors to remove contributions from Bremstrahlung radiation (e.g., photons emitted from collisions of neutrons with materials) and from any gammas that might penetrate to different depths in the stack. In the context of a gamma detector, detector 1201 would appear similar a Compton telescope, where incident gamma 1222-2 and scattered gamma 1224-2 represent the typical types of collimated gamma events detected by each logical detector in detector 1201. In the context of a neutron detector, detector 1201 is arranged to retrieve as much information about incident neutron energy as possible through proton-recoil interactions. In each interaction/event, a neutron (e.g., incident neutron 1222-1, scattered neutrons 1224-1 and 1226-1) deposits some energy in a scintillator. Subsequent interactions deposit more energy, and will be coincident in time (e.g., with the discriminator relying on the neutron time of flight between detector elements). The summation of the coincident events estimates the energy of incident neutron 1222-1, which can be used in identifying the neutron source material (e.g., can produce a neutron spectrograph).

Neutron Imagery

Figure 13:
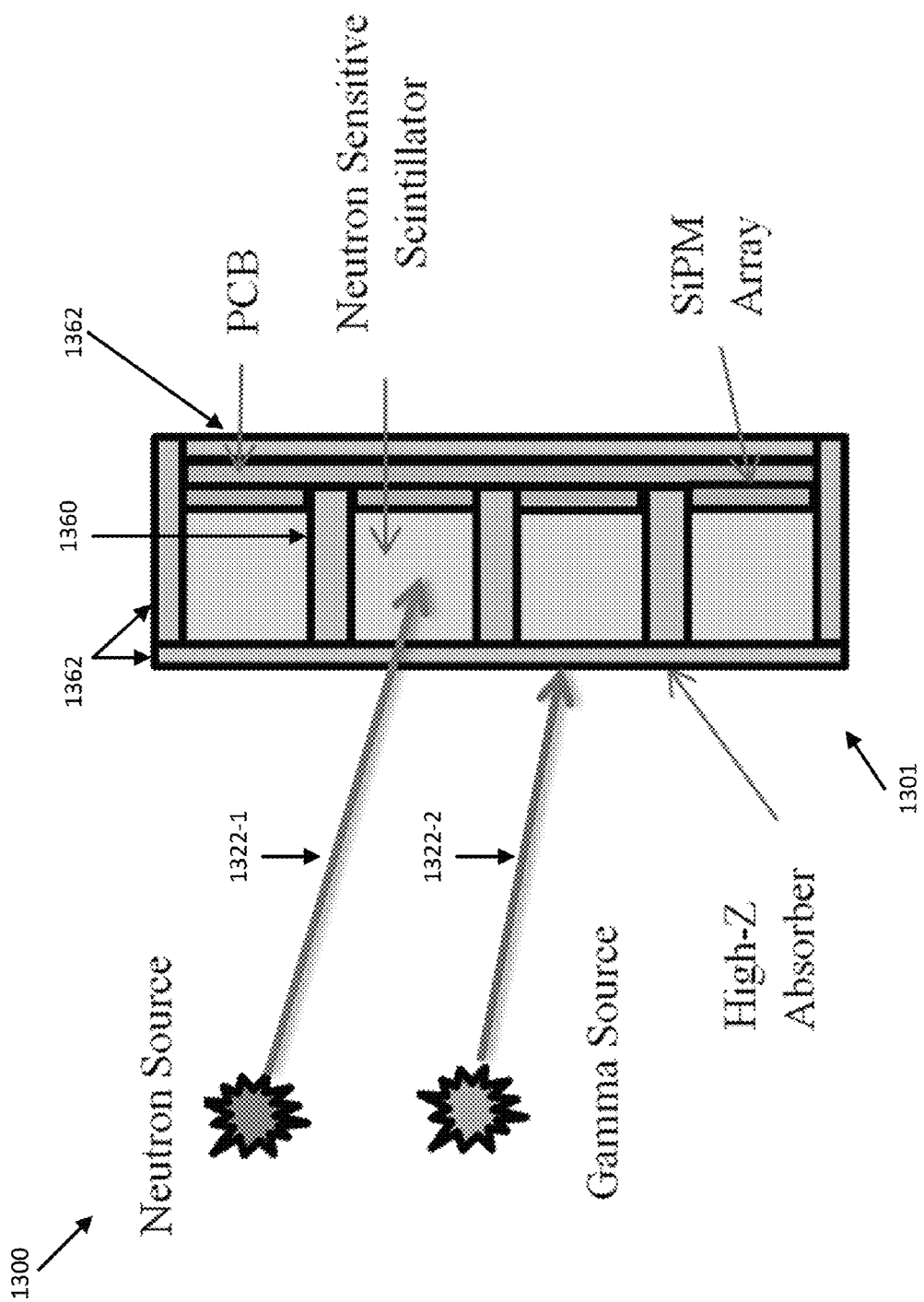
FIG. 13 illustrates a block diagram of an SiPM-based radiation detection system in accordance with an embodiment of the disclosure.

A neutron imager may also be implemented using a design similar to detector 1101 in FIG. 11 (e.g., corresponding to a neutron imaging operational mode). For example, FIG. 13 shows system 1300 illustrating operation of an embodiment of a neutron imaging detector (e.g., neutron detector 1301), which may be a modified form of detector 1101 in FIG. 11. For example, detector 1301 includes high-Z absorber 1360, but omits absorber 1170 and screening material 1172, and instead includes high-Z shielding 1362 entirely enclosing the active portions of detector 1301 to reduce gamma events. In some embodiments, the logical detectors may be arranged in a plane of logical detectors, similar to a pixelated focal plane array. The scintillator material is neutron sensitive, where a typical material requirement is that the material includes boron, lithium-6, or gadolinium (e.g., borated PVT, lithium doped PVT, lithium iodide, or a gadolinium doped aluminum garnet), for example.

In various embodiments, each logical detector may be adapted to act independently, and so in such embodiments, there is no need to determine coincidence. Coupled electronics may therefore be adapted to operate as many separate counting units. For example, an event detected in one pixel may increment the record for that pixel by one, and the resulting combination of pixel records may be presented as a greyscale image, similar to one obtained from CT or x-ray film, where the value for each pixel corresponds to an intensity in the greyscale image. Neutron imagery may be used for non-destructive testing of large structures, for example, and the use of an array of SiPM pixels significantly reduces the time necessary to obtain such imagery (e.g., as compared to neutron film technology), which coincidentally helps reduce the dose to an operator of the imager and/or to the structure being imaged, and/or requires a lower activity neutron source for the same image detail, which increases safety to the environment/public.

Well Logging

Scintillation radiation detectors are utilized in the oil and drilling industries for characterization of the composition of earth in which a hole in being drilled. Due to the very high cost of drilling equipment and labor, the importance of keeping the detectors in working order is very high. Such detectors typically experience high temperatures, large mechanical shocks, and substantial magnetic interference, and so conventional PMT-based detectors are relatively unreliable and present a common source of downtime.

As noted above, SiPM-based radiation detectors are inherently ruggedized, relatively immune to magnetic interference, and can withstand immense mechanical and temperature shock. Furthermore, SiPM-based radiation detectors are much more compact and, moreover, can continue to operate reliably even when a portion of the detector is malfunctioning. For example, a gain stabilized SiPM-based radiation detector including multiple logical detectors may be used as a gross counter/calorimeter to obtain a gamma energy spectrum. Should one of the logical detectors (e.g., SiPMs or coupled scintillators) fail, the associated electronics may be adapted to shut off/de-energize the malfunctioning portion of the detector and maintain operation using the remaining functioning portion of the detector. Such mode of operation may be referred to a ruggedized operational mode.

In embodiments where the SiPM-based radiation detector includes neutron absorbing scintillator materials, the detector may replace He-3 or $BF_3$ based neutron detector tubes that are particularly sensitive to mechanical vibration. Because of the reduced size of SiPM-based detectors, as illustrated in FIG. 2, it is often possible place separate SiPM-based neutron and gamma detectors, or multiple SiPM-based gamma detectors, within the same volume conventionally used by a single PMT-based gamma detector.

Portable Radiation Detection

Personal radiation detectors (PRDs), as described in ANSI N42.32 and N42.33 standards, conventionally consist of a radiation sensor, high voltage supply, microcontroller, and display in a low-cost housing. A conventional PRD is only capable of showing count rate or dose rate. The detector assembly is conventionally a Geiger-Mueller tube or a scintillator coupled to a PMT. SiPM-based PRDs are smaller than both conventional implementations, and do not require an HV supply. In some embodiments, a flash-ADC may be utilized to partition the energy ranges of the pulses provided by the SiPMs in order to facilitate energy correction of the dose rate. A microcontroller may be adapted to aggregate counts and provide display and alarm functions. The scintillator may be a NaI(Tl), CsI(Tl), or other type that is sized to meet a certain sensitivity and high end dose rate limit for a given application.

Spectroscopic personal radiation detectors (SPRDs), as described in the ANSI N42.48 standard, conventionally consist of a radiation sensor, high voltage supply, signal processor, and display in a low-cost housing. A conventional SPRD is capable of showing count rates and dose rates, identifying source radioisotopes, and spectroscopy. The detector assembly is conventionally a semiconductor (CZT) or a scintillator coupled to a PMT. Some SiPM-based SPRDs do not require a HV supply. In some embodiments, an ADC may be utilized to acquire event signals, which may be delivered to and processed by a DSP or an FPGA and then stored as an energy spectrum. The scintillator material (e.g., NaI(Tl), CsI(Tl) or others) should be capable of energy resolutions <8.0% at 662 keV to facilitate nuclide identification. The number of SiPM pixels/chips in the array and the size of the scintillators may be adjusted according to the sensitivity and upper dose rate/upper count rate range requirements.

Radioisotope identification devices (RIDs), as described in the ANSI N42.34 standard, conventionally consist of a large, high resolution radiation sensor, high voltage supply, signal processor, and a display in a housing. The detector assembly is conventionally high purity germanium or CZT, or a scintillator coupled to a PMT. SiPM-based RIDs may be implemented with any or all of the capabilities described previously, such as gross counting, Compton suppression, and directionality. The scintillator material may be NaI(Tl), LaBr3(Ce), or other scintillating material capable of energy resolutions <8.0% at 662 keV.

In some embodiments, SiPM-based PRDs, SPRDs, and RIDs may be implemented with screens, LED alarms, vibration motors, speakers, GPS, signal processing electronics, a low-voltage portable power supply, and other components, for example, that are typically also found in a conventional smart phone. In other embodiments, SiPM-based PRDs, SPRDs, and RIDs may be adapted to couple to (e.g., form a communication link with) a smart phone and use the smart phone's electronics to perform various functions for alarming, logging, reach back, spectroscopy, and signal processing. This is enabled, at least in part, by the relatively low voltage operation of the constituent SiPMs. SiPM-based PRDs, SPRDs, and RIDs may therefore be implemented to rely on external electronics (e.g., such as those found in a conventional smart phone) to enable particular operational modes, which allows their design to be relatively simple and inexpensive to manufacture. In further embodiments, SiPM-based PRDs, SPRDs, and RIDs may be implemented to be integrated with a portable electronic device, such as a smart phone. In various embodiments, the SiPM-based PRD, SPRD, or RID may be implemented compactly as a scintillator coupled to an SiPM and a bias voltage supply. Optionally, a signal processor or other logic device may be included in the SiPM assembly, as described herein.

In embodiments where signal processing is done on board, the electronics may include an ADC, FPGA, and/or ASIC to manage the signal processing. The detector assembly may be adapted to communicate with the portable electronic device (e.g., a smart phone) by USB, other wired connections, or via Bluetooth™ or other wireless connections. In embodiments using wired connections, the detector assembly may be adapted to utilize the power source for the portable electronic device, in which case the detector assembly may lack its own power source (e.g., a battery and charging circuitry). In some embodiments, a portable electronic device may be adapted to execute software to acquire and parse data from the detector assembly, and then to display dose rate, count rate, alarms, reach back functions, and spectroscopic identification results derived from the data from the detector assembly, for example.

In embodiments where signal processing is performed on a coupled portable electronic device (e.g., a smart phone), a wired connection may be required to meet the data throughput necessary for data processing associated with a particular operational mode. The detector assembly electronics may include a microcontroller to perform stabilization, adjust bias voltage, and store and retrieve calibration information, and an ADC to digitize signals from the SiPM. Data (digitized signals, calibration data, and/or other data), may be passed via wired connection to the portable electronic device. The detector assembly may or may not include its own power source. The portable electronic device may be implemented with low-level programming capability to process the data provided by the detector assembly and generate energy spectra and alarm events. In some embodiments, the portable electronic device may be adapted to display dose rate, count rate, alarms, perform reach back functions, and show identification results. A database of known identification results (e.g., for comparison purposes) may be stored locally or may be accessed over a network.

Portal Monitoring

Portal monitors in fixed installations typically exist to monitor pedestrians, vehicles, and/or packages as they transit through an entrance or exit (e.g., a portal) to an associated structure, such as in an airport, seaport, entrance/exit to an entertainment venue or other public venue, or a package shipping and/or mailing processing center or drop-off. Scintillators used in stationary designs generally occupy a large volume in order to maximize sensitivity. For non-spectroscopic detectors, large plastic/PVT scintillators may be used because they are far cheaper than crystalline scintillators; the tradeoff is lower light yield and poor identification fidelity. Crystalline scintillators, primarily NaI(Tl), are extremely expensive in large volumes and have physical limitations on their maximum size. SiPM arrays are much more compact and less expensive to implement than large area or multiple small area PMTs.

Figure 14:
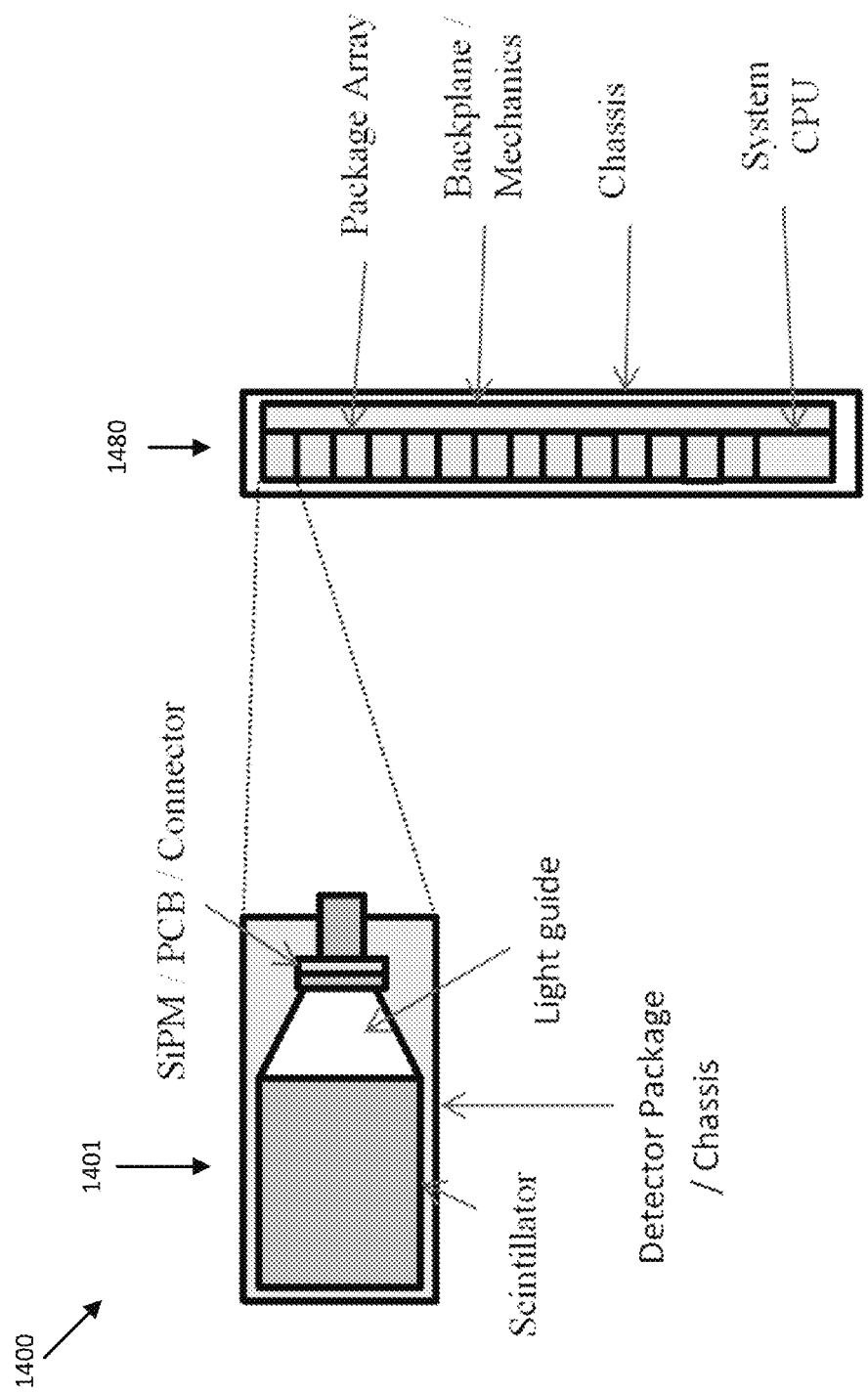
FIG. 14 illustrates a block diagram of an SiPM-based radiation detection system in accordance with an embodiment of the disclosure.

FIG. 14 illustrates a block diagram of an SiPM-based radiation detection system in accordance with an embodiment of the disclosure. Specifically, FIG. 14 shows system 1400 illustrating an embodiment of an SiPM-based portal detector (e.g., portal detector 1480) that includes multiple SiPM-based radiation detectors (e.g., detector 1401). Detector 1401, as shown in FIG. 14, may include a scintillator (PVT, NaI(Tl) or other), a light guide for geometric matching of the scintillator to the SiPM array, an SiPM array, a PCB supporting the SiPM array and including necessary electronics for the application and a connector, where the detector assembly is placed with a factory calibrated and sealed package that may be mounted in a backplane of portal detector 1480 that is shaped to meet absolute efficiency/sensitivity requirements as prescribed by a particular application.

In embodiments where portal detector 1480 is a counting portal, the PCB may contain a bias voltage controller, a temperature probe for stabilization, a flash ADC for energy windowing, and a microcontroller for data handling and system control. In embodiments where portal detector 1480 is a spectroscopic portal, the PCB may contain a bias voltage controller, a temperature probe for stabilization, a high speed ADC, and an FPGA/ASIC for signal processing, stabilization, and data handling. In both embodiments, the backplane may include a mechanical array whereby the detectors are mounted in user-serviceable racks. A system CPU may be adapted to aggregate data from each pixel in the detector array, perform alarm and logging functions, and/or perform identification. In some embodiments, detector 1401 may be implemented as any one or combination of detectors assemblies described herein, including those used for neutron detection. Furthermore, individual detectors within portal detector 1480 may be implemented with any one or combination of detector assemblies described herein.

These embodiments take advantage of smaller, cheaper detectors, and combine them into a large array that is easily user-serviceable (e.g., by replacing individual detectors), thereby removing the need for field service technicians or on-site storage of very large detectors. Additionally, should one of the detectors 1401 fail, portal detector 1480 may still be able to operate without significant degradation to sensitivity and without necessitating closure of a portal while the detector is serviced.

Figure 15:
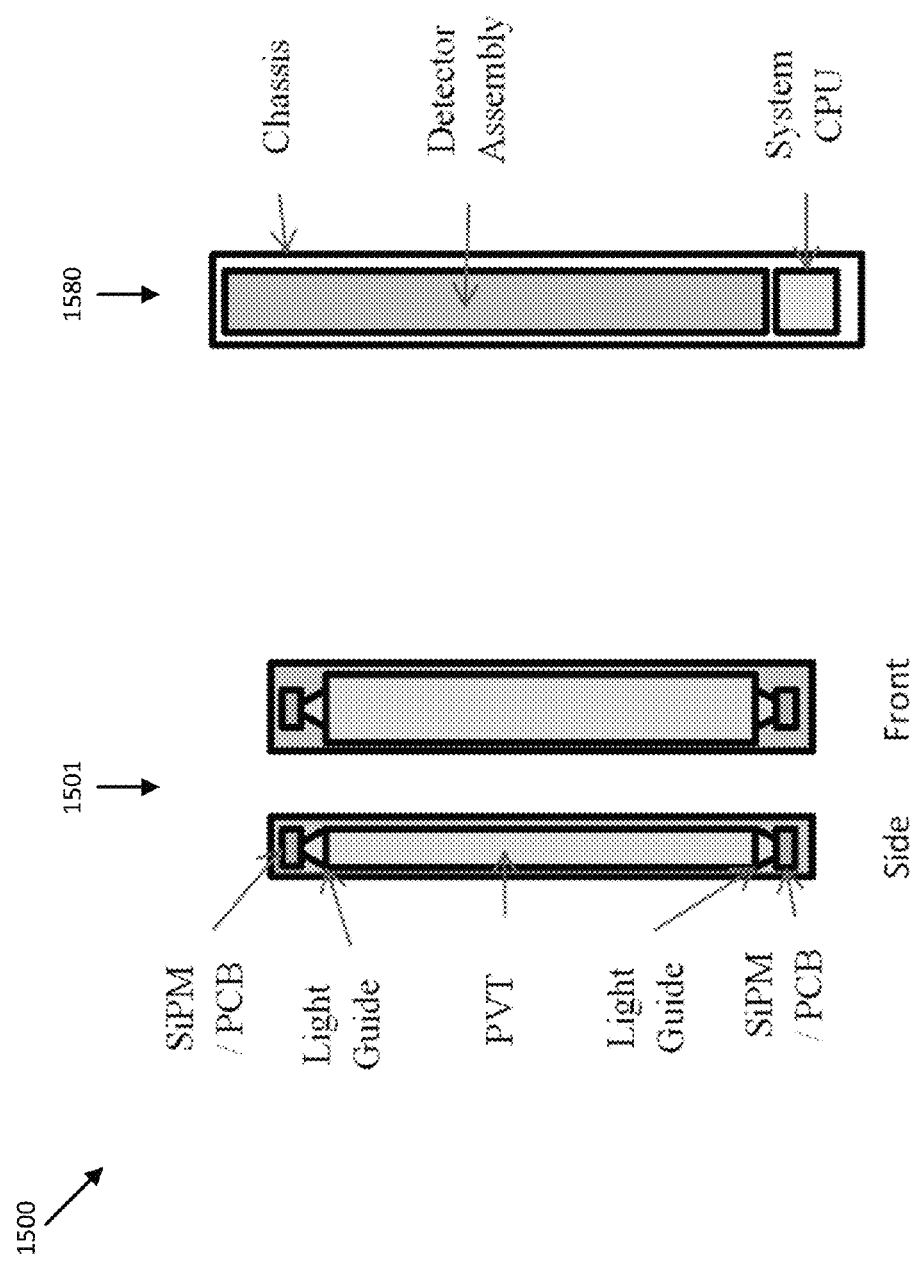
FIG. 15 illustrates a block diagram of an SiPM-based radiation detection system in accordance with an embodiment of the disclosure.

FIG. 15 illustrates a block diagram of an SiPM-based radiation detection system in accordance with an embodiment of the disclosure. Specifically, FIG. 15 shows system 1500 illustrating an embodiment of an SiPM-based portal detector (e.g., portal detector 1580) that includes multiple SiPM-based radiation detectors (e.g., detector 1501), but where a large volume scintillator is mated with SiPMs on either end (e.g., a pair of SiPMs disposed on opposing surfaces of the scintillator). For example, detector 1501 may include a large PVT scintillator with either end connected to a light guide to correct for geometric mismatch, and an SiPM array, PCB, bias voltage controller, temperature probe, and connector coupled to each light guide, as shown. A system CPU may include a multichannel ADC, and/or FPGA/ASIC for signal processing, and other logic devices for data handling, for example. In some embodiments, a fast signal output from the SiPMs may be used for time discrimination and energy-position correction. PVT has significant self-attenuation of light during transport from the location where an event occurs to an optical interface. By utilizing fast signal characteristics of SiPMs on either end as an indicator of the event position within the detector, the attenuation may be corrected, thereby improving the resolution of the detector without a need for digitization and delay line amplification. Portal detector 1580 may include one or more of detectors 1501, in some embodiments similar to detector 1480 in FIG. 14 (e.g., side by side vertically).

In various embodiments, the designs illustrated in FIGS. 14 and 15 may be adapted to implement a human-portable portal detector, such as by limiting the size of the scintillators and/or the number of detectors in the portal detector. In other embodiments, a human-portable portal detector may be implemented in a single-ended form as shown in FIG. 16.

Figure 16:
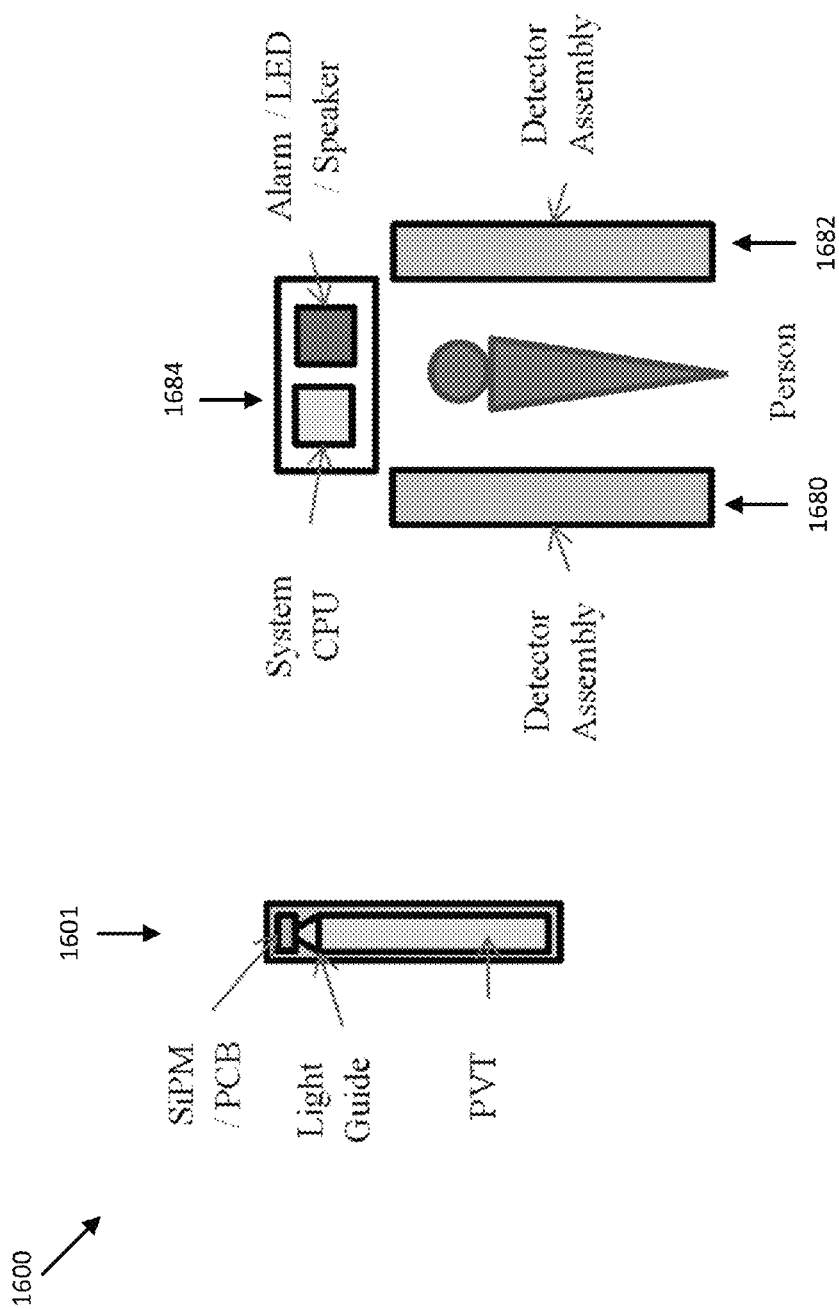
FIG. 16 illustrates a block diagram of an SiPM-based radiation detection system in accordance with an embodiment of the disclosure.

FIG. 16 illustrates a block diagram of an SiPM-based radiation detection system in accordance with an embodiment of the disclosure. Specifically, FIG. 16 shows system 1600 illustrating an embodiment of an SiPM-based portal detector (e.g., portal detector 1680, 1682, 1684) that includes multiple SiPM-based radiation detectors (e.g., detector 1601). In this form of portal detector, the array must minimize weight, and maximize sensitivity over the vertical range of 10 cm to 200 cm. Detector 1601 may include a scintillator (PVT, NaI(Tl), or other material), light guide, SiPM array, and a PCB with bias voltage circuitry, microcontroller (for calibration parameters/voltage control), and a connector. In the distributed portal detector 1680, 1682, 1684, two or more detectors 1601 (e.g., 1680 and/or 1682) may be in communication with a system CPU 1684. The system CPU may include a multichannel ADC adapted to digitize the signals from each detector, an FPGA/ASIC for signal processing, and other logic devices to perform and control logging, alarms, occupancy checks, and background stabilization.

Alpha/Beta/Gamma Detection

Figure 17:
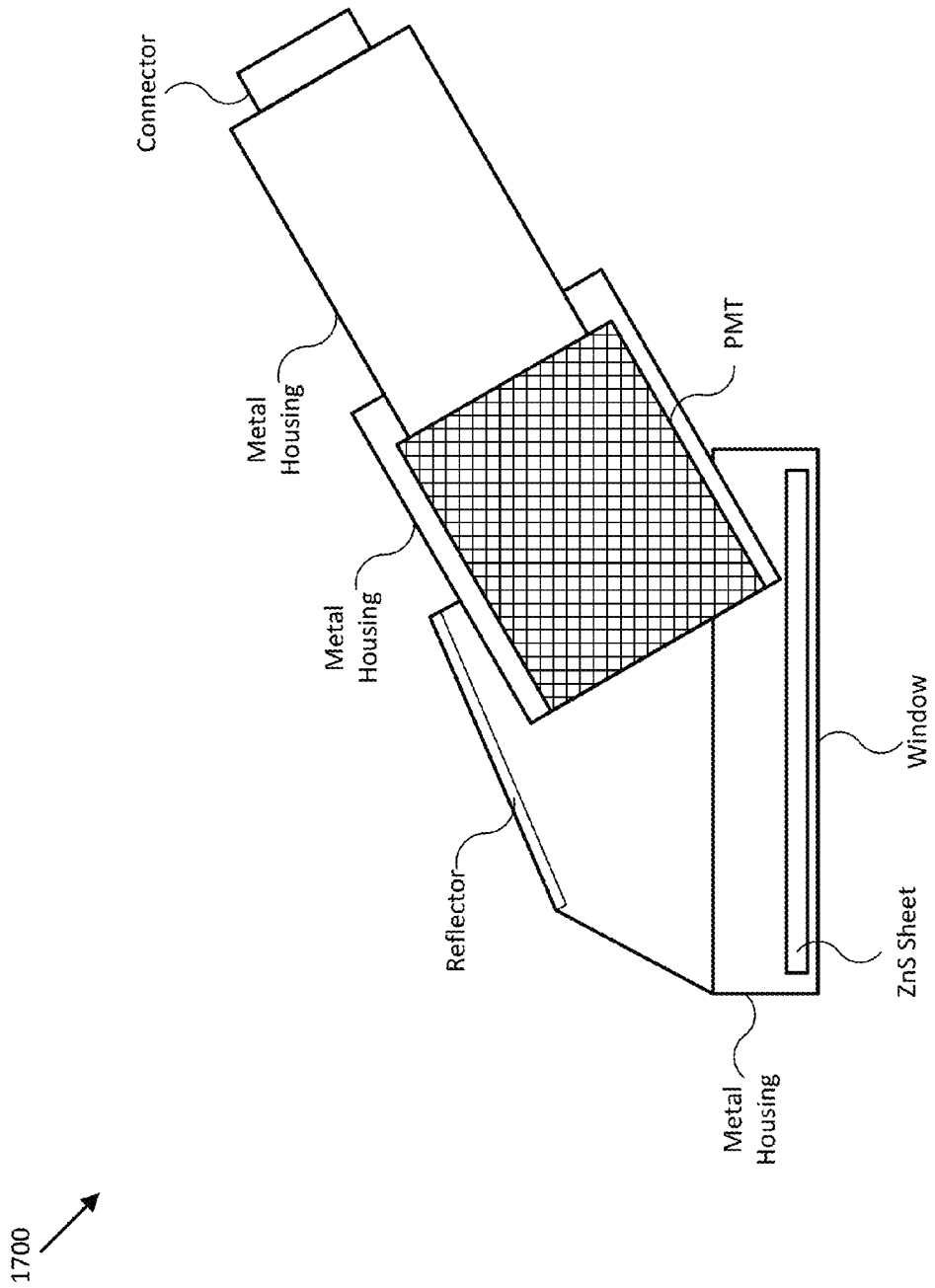
FIG. 17 illustrates a diagram of a PMT-based radiation detection system.

The very first counter of individual radiation events was a simple sheet of zinc sulfide with a radium alpha source in close proximity. Alpha particles would strike the sheet, emitting a discrete flash of light (450 nm) that could be individually counted. A conventional scintillation alpha probe consists of metal housing, with an opening for a ZnS(Ag) sheet covered with an aluminized Mylar window (for protection of the scintillator, mild RF shielding, and to allow a light tight seal), some optical reflector, and a PMT to record the light, as shown in diagram 1700 of FIG. 17. The physical dimensions and orientations of conventional detectors are dictated by the usage of a PMT.

Figure 18:
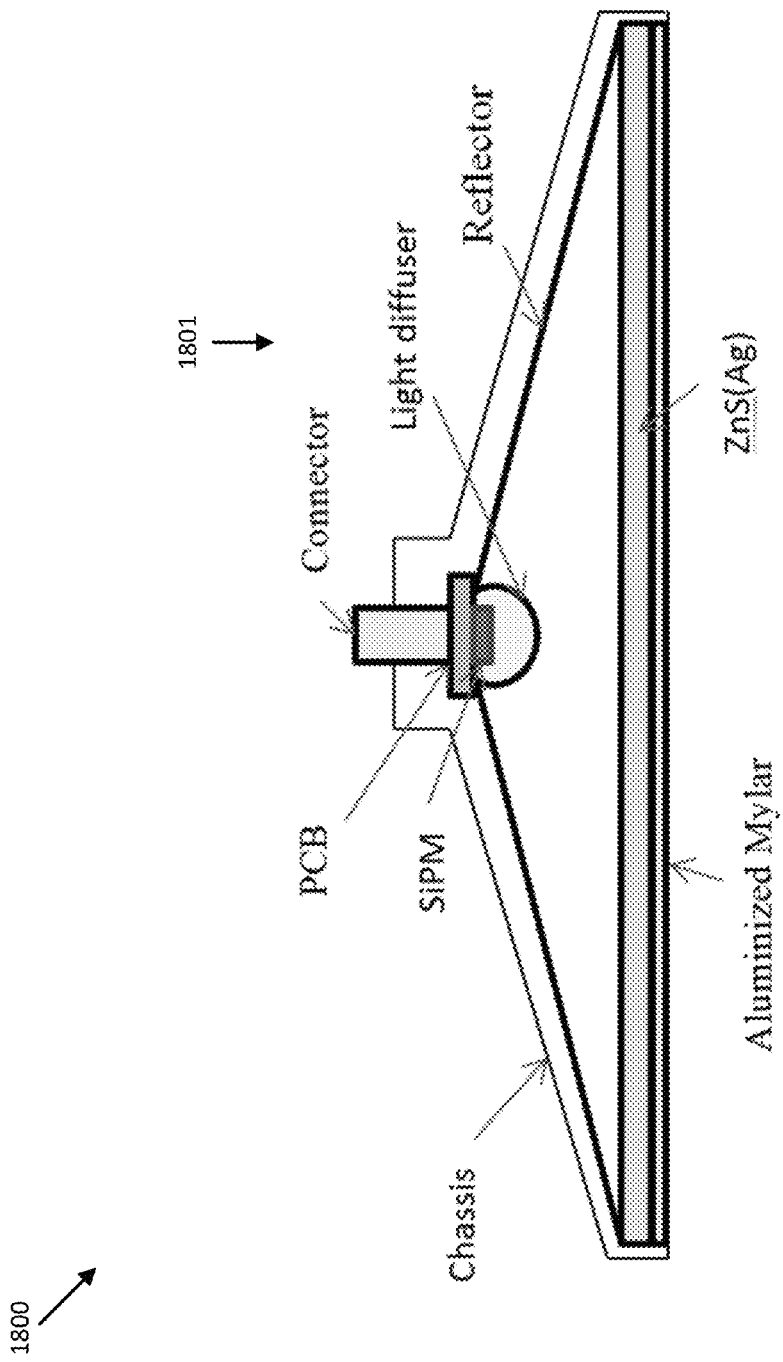
FIG. 18 illustrates a block diagram of an SiPM-based radiation detection system in accordance with an embodiment of the disclosure.
Figure 19:
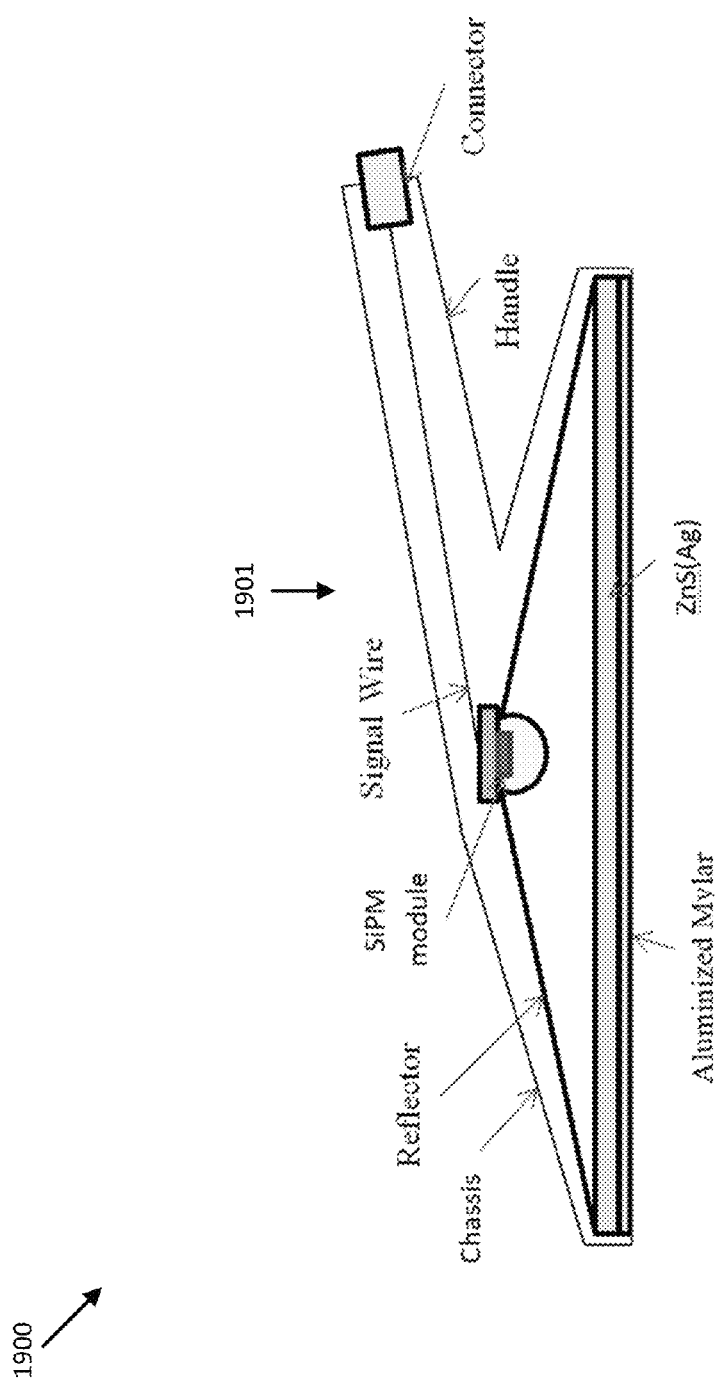
FIG. 19 illustrates a block diagram of an SiPM-based radiation detection system in accordance with an embodiment of the disclosure.

The use of SiPM-based alpha detectors allows the size, orientation, and sensitivity of the detectors to be adjusted to fit a particular need. For example, FIGS. 18 and 19 show respective systems 1800, 1900 illustrating embodiments of SiPM-based alpha detectors 1801, 1901 (e.g., corresponding to an alpha detector operational mode). As shown in FIGS. 18 and 19, detectors 1801 and 1901 may include an SiPM and a light diffuser. In typical operation, an alpha source emits a particle that passes through the aluminized Mylar opening and interacts with the zinc sulfide sheet. Blue light is then emitted isotropically from the point of interaction with some fraction entering the void between the zinc sulfide and the reflector. Light is directed to the diffuser by the usage of an optically directed specular reflector (aluminum foil, silver-polymer mirror, etc.) that conserves the angles and minimizes the number of reflections. A bulb-shaped light diffuser collects incident light and directs it towards the SiPM. In some embodiments, the light diffuser may not be necessary for operation of the detector, and the single SiPM may be replaced by an array of multiple SiPMs depending on a desired maximum range of detection.

Given the very high gain of the SiPM and low quantity of the collected light, the embodiments illustrated by FIGS. 18-19 will have a wide range of sensitivity and little interaction from gammas or betas, very similar to the PMT-based devices that are the current state of the art, but with a much smaller and much less expensive package. In some embodiments, detectors 1801 and/or 1901 may be adapted to be drop-in replacements for existing PMT-based detectors, and the outputs from the SiPMs can be analog and in the range of existing PMTs to work with existing electronics. In alternative embodiments, full calibration may be included in each detector 1801,1901 by including power supplies, pulse processing, and a microcontroller to provide count rates, for example, to an external data logging device, either through a cable or wirelessly.

Beta radiation emitting isotopes (Sr-90/Y-90) that are present on contaminated surfaces may be detected with survey probes designed to be sensitive to beta radiation and minimally sensitive to gamma radiation. With a thin PVT radiation detector, the probability for interaction of a gamma per unit mass is rather poor given the low Z-value of the material. However, the stopping power for a single charged electron (e.g., a beta particle) is extremely high. In practice, these probes are often in close proximity to the sources as many beta emitting isotopes have a mean path lengths of only a few centimeters or less. There are two general types of probes that are utilized for this detection method: the "wand" type shown in FIG. 20, and the "paddle" type shown in FIG. 21 (where the chassis may also include the handle as shown in FIG. 19).

Figure 20:
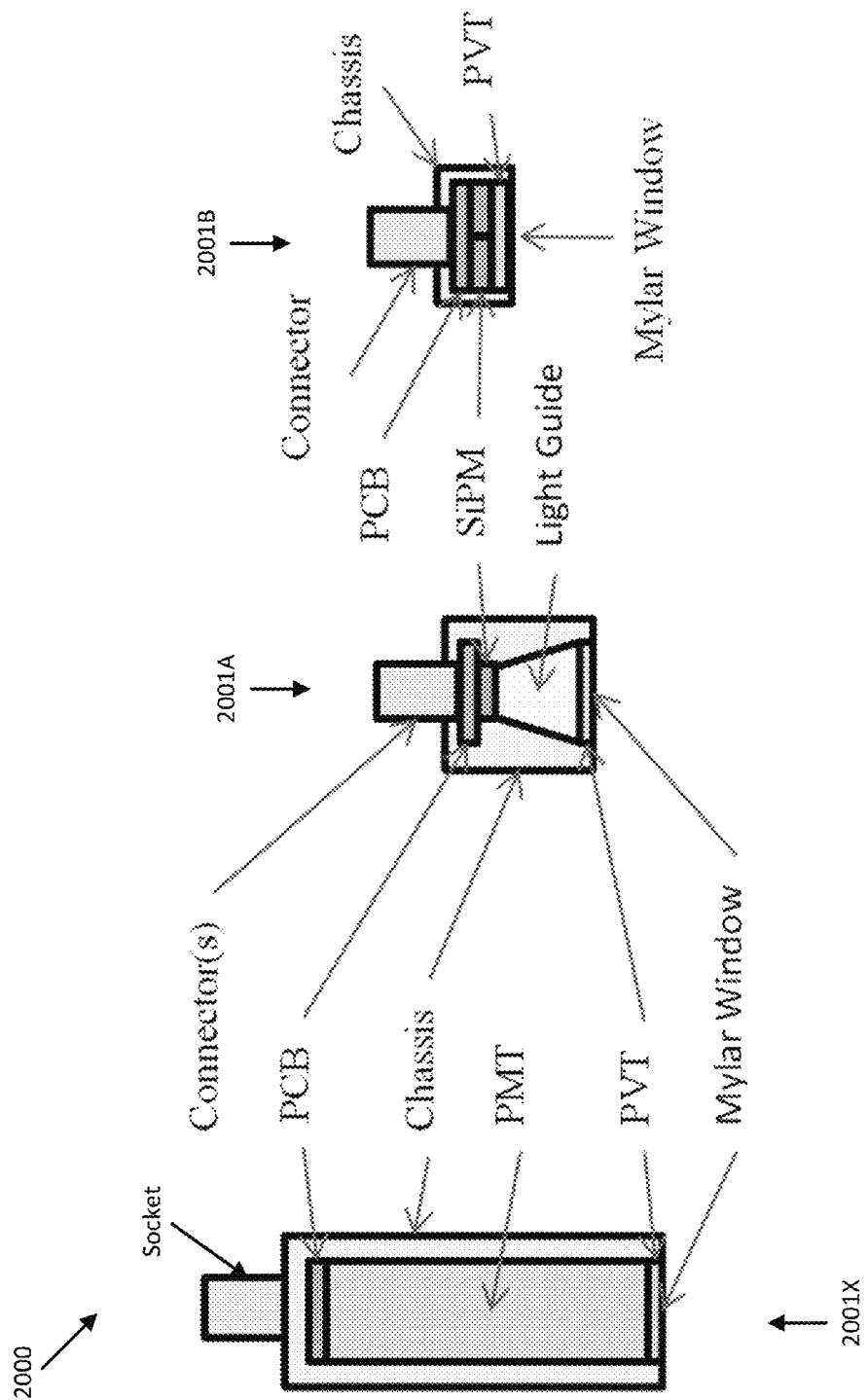
FIG. 20 illustrates a diagram of a PMT-based radiation detection system and block diagrams of SiPM-based radiation detection systems in accordance with an embodiment of the disclosure.

FIG. 20 illustrates block diagrams of SiPM-based radiation detection systems in accordance with an embodiment of the disclosure. Specifically, FIG. 20 shows diagram 2000 illustrating three "wand" beta detectors (e.g., SiPM-based beta detectors 2001A and 2001B, and PMT-base beta detector 2001X). The wand type detector typically consists of a very thin PVT scintillator behind an aluminized Mylar window that acts as an ambient light blocker, protective screen, and mild-RF shield for the detector. In conventional detector 2001X, a PMT provides the light readout from the PVT, where the signal is buffered on a PCB. The socket provides a ground, high voltage, and some voltage required by any active components. In SiPM-based detectors 2001A and 2001B (e.g., corresponding to a beta detector operational mode), the chassis is much smaller, does not contain magnetic shielding for the PMT, and only requires a low voltage connector.

FIG. 20 illustrates two embodiments for SiPM beta detectors: one with a light guide to minimize the number of SiPMs required (2001A), and one without a light guide (2001B), which may be selected based on, for example, the cost of the light guide, the cost of additional/larger SiPM chips, and/or the desired size/length of the detector. In both embodiments, the beta radiation would enter the detector through the Mylar window and interact in the PVT, and the PVT would emit a blue light that is collected by the SiPM. The signal from the SiPM would then be transmitted back to a data logger, as described herein. Direct interactions of betas with the SiPM would excite only a few pixels at a time, which would typically be within the noise region of the PVT/SiPM detector assembly.

Figure 21:
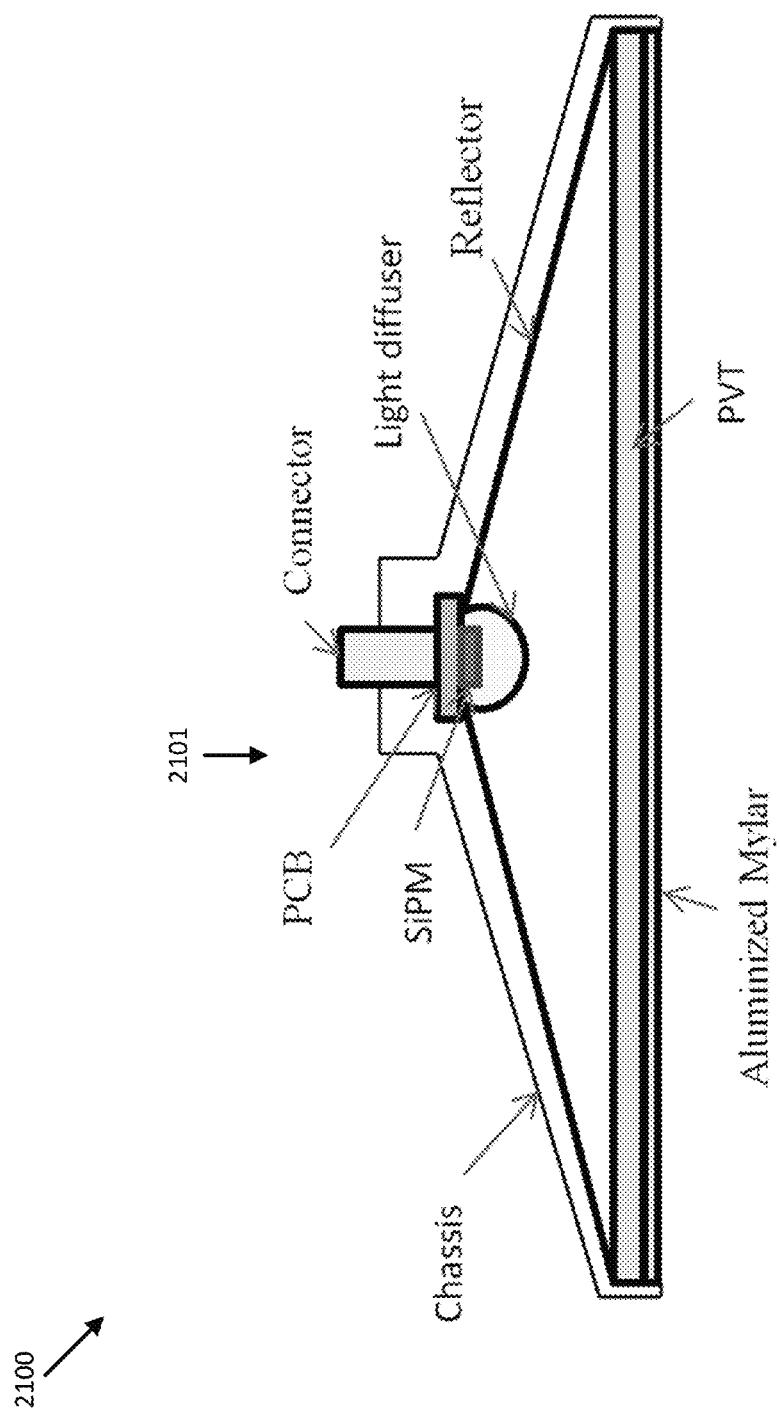
FIG. 21 illustrates a block diagram of an SiPM-based radiation detection system in accordance with an embodiment of the disclosure.

Similar in operation to the wand-type, the paddle-type offers a wider surface area for the detection. FIG. 21 shows system 2100 illustrating an embodiment of a paddle SiPM beta detector (e.g., SiPM-based beta detectors 2101). In various embodiments, a beta enters through the Mylar window and interacts in the PVT. Light generated by the event exits the PVT, and the reflector directs the light towards the light diffuser. The light diffuser then concentrates the light onto the SiPM. In some embodiments, the light diffuser may not be necessary for operation of the detector, and the single SiPM may be replaced by an array of multiple SiPMs depending on a desired maximum range of detection. Typically, the PVT will experience some gamma interaction as well, but the false-positive detection is mitigated by the very thin PVT utilized in the design (e.g., 0.1") such that there will be little probability of interaction for most gamma energies.

SiPM-based radiation detectors may also be implemented as beta-gamma detectors (e.g., corresponding to a beta-gamma detector operational mode), where the detector assemblies include two types of scintillators, each selected to scintillate in the presence of one or the other ionizing radiation type. In various embodiments, PVT is selected as the beta-type scintillator because it is light, is inexpensive to produce, and has a high stopping power for beta particles at thicknesses that rarely scatter gammas. The gamma-type scintillator may be selected from a number of alternatives based on the intended sensitivity and packaging. Some scintillators are hygroscopic (e.g., NaI(Tl) and CsI(Tl)) and require significant packaging to protect against moisture, while other scintillators are not hygroscopic (e.g., BGO), and any of the aluminum garnet scintillator types (e.g., YAG, LuAG, GAG, GYGAG, etc., which are referred to collectively as xAG) do not require additional packaging for a hermetic seal.

Figure 22:
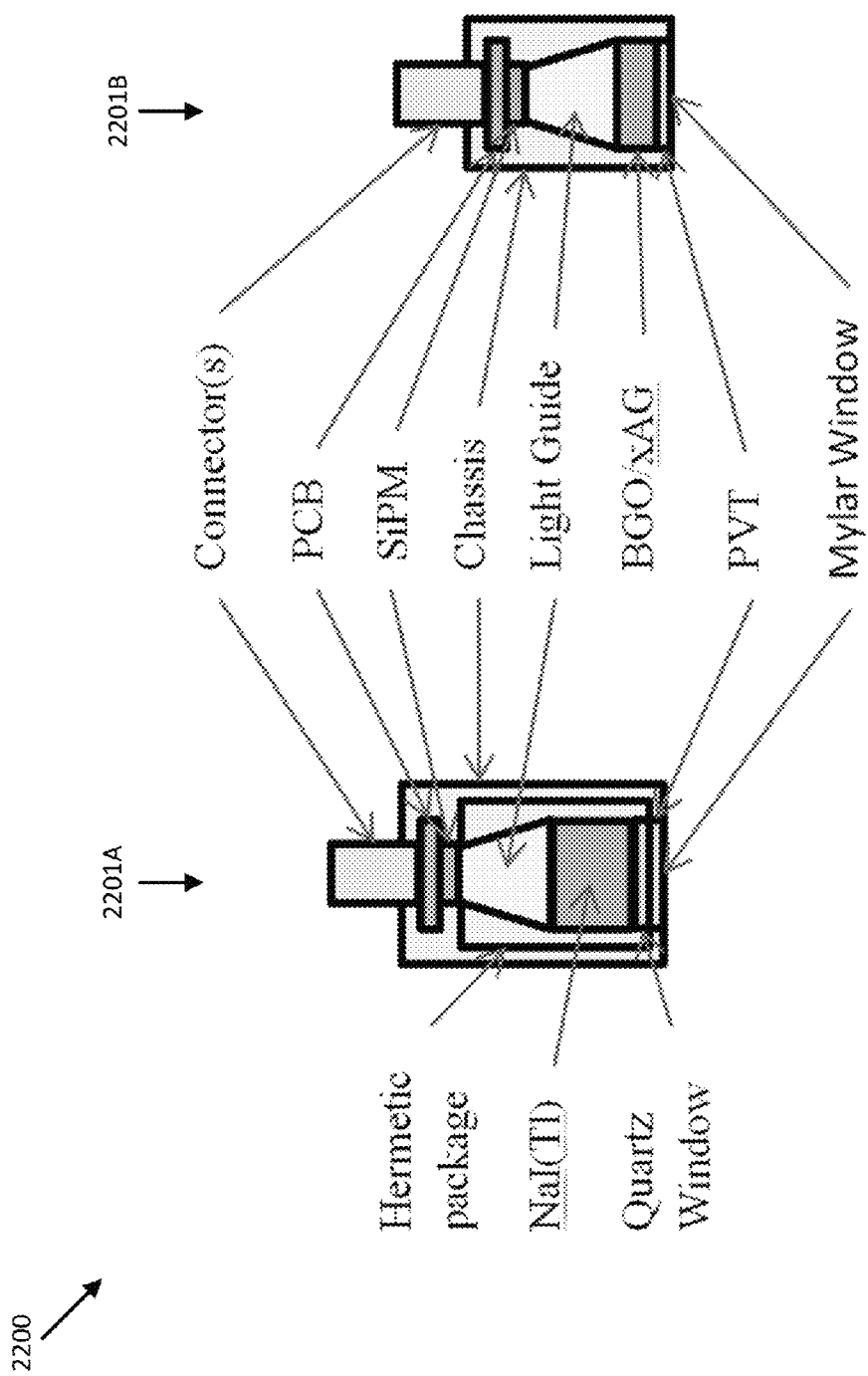
FIG. 22 illustrates block diagrams of SiPM-based radiation detection systems in accordance with an embodiment of the disclosure.

FIG. 22 illustrates block diagrams of SiPM-based radiation detection systems in accordance with an embodiment of the disclosure. Specifically, FIG. 22 shows diagram 2200 illustrating two "wand" beta-gamma detectors (e.g., SiPM-based beta-gamma detectors 2201A and 2201B). Detector 2201A, with the hygroscopic scintillator, includes a hermetic package to protect the scintillator. In some embodiments, the hermetic package in implemented as an aluminum-walled housing, with hermetic seals located between the housing and the quartz window and the housing and light guide. In the case of a beta particle, the beta enters the Mylar window and interacts with the PVT. The beta-initiated light then transmits through the quartz window and the inorganic scintillator, is concentrated in the light guide, and then is collected by the SiPM. In the case of a gamma particle, the gamma passes through the Mylar window, may interact with the PVT, but will most likely pass through and interact only in the inorganic scintillator. Light then exits through the light guide and is collected by the SiPM. A combined beta-gamma source (e.g. Cs-137) will produce the two effects, and, in some embodiments, the results will be superimposed in the readout electronics.

Detector 2201B, with the non-hygroscopic scintillator, does not require an hermetic package, so the detector may be made more compact. In the case of a beta particle, the beta traverses the Mylar window and interacts with the PVT. The beta-initiated light then transmits through the inorganic scintillator, and is concentrated in the light guide and is collected by the SiPM. In the case of a gamma particle, the gamma passes through the Mylar window, may interact with the PVT, but will most likely interact in the inorganic scintillator. Light then exits through the light guide and is collected by the SiPM. A combined beta-gamma source (e.g. Cs-137) will produce the two effects, and, in some embodiments, the results will be superimposed in the readout electronics. For dose rate survey instruments, the quality factor associated with x-rays, gammas, and electrons are all 1, so any simultaneous beta and gamma detection will be reported as the proper dose and will present a result similar to that achieved by conventional PMT-based instruments.

Ideally, the light levels for the two scintillators should be somewhat equal at the SiPM to allow a single gain setting during calibration. However, in some embodiments, it may be possible and beneficial to keep the two at different regions within the dynamic range of the readout electronics such that individual particles may be differentiated by method of peak amplitude. In other embodiments, particles may be differentiated by using a fast signal output from the SiPM as a start signal/trigger, and by using a slow signal output as a stop signal/trigger. The slow signal will be proportional to the light output and decay time of the scintillator, which is typically material-dependent. For example, PVT has a decay time of ~2 ns, while NaI(Tl) has a decay time of ~230 ns (e.g., BGO ~300 ns). Pulse rise times may be similar and/or indistinguishable after detection/digitization by pulse processing electronics, but pulse widths will be very different. Comparing the pulse width with the fast signal time will give a clear distinction between the signal types. Readout electronics (e.g., an ADC, FPGA, ASIC, or other type of logic device) may be adapted to use such comparison to link each event to one or the other scintillator and thereby provide a method for differentiating beta detection from gamma detection.

Figure 23:
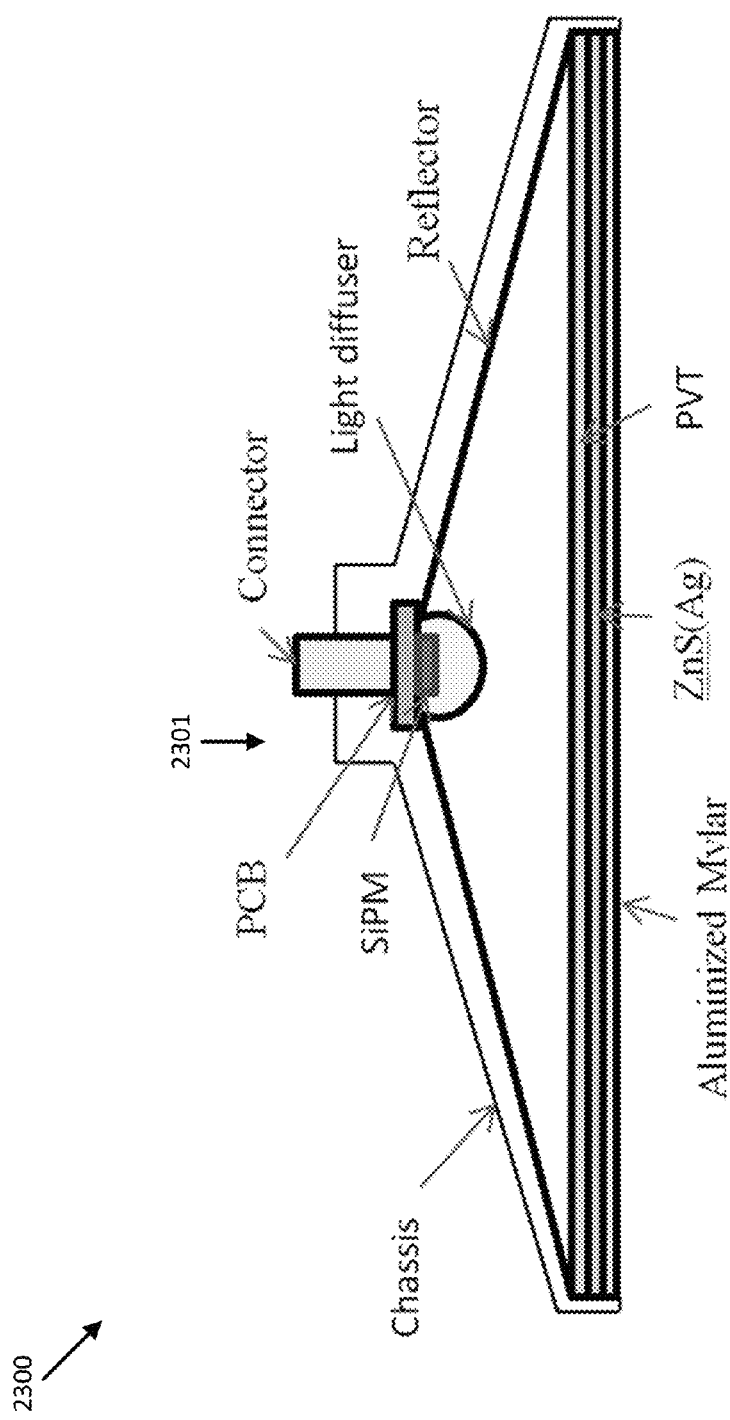
FIG. 23 illustrates a block diagram of an SiPM-based radiation detection system in accordance with an embodiment of the disclosure.

Similar to the design for the beta detectors, adding a layer of ZnS(Ag) between the Mylar window and PVT will provide the capability for both alpha and beta detection (e.g., corresponding to an alpha-beta detector operational mode). FIG. 23 shows system 2300 illustrating a paddle-type alpha-beta detector (e.g., SiPM-based alpha-beta detector 2301). In the case of alpha radiation, the alpha particle enters through the Mylar window and deposits its energy in the ZnS(Ag), similar to the alpha-only probes. The alpha particle is fully attenuated in this layer and does not interact with the PVT. Light from the ZnS(Ag) transmits through the PVT, is directed towards the diffuser by the reflector, and is ultimately detected by the SiPM. In the case of beta radiation, the beta enters through the Mylar window, deposits some energy in the ZnS(Ag), and deposits the remainder of its energy in the PVT. Light from both the ZnS(Ag) and PVT is directed towards the diffuser by the reflector and is ultimately detected by the SiPM. A source emitting alpha and beta radiation simultaneously (e.g. thorium and radium sources) will produce the two effects, and, in some embodiments, the results will be superimposed in the readout electronics.

Ideally, light levels should be equalized to allow common gain operation on both signals. In some embodiments, the type and/or thickness of PVT material may be selected to adjust the PVT light output and/or transmittance of the ZnS(Ag) light output. Typically, proper selection of PVT material and/or thickness can bring the light outputs at least within the same order of magnitude/event. As with the single-particle probes, in some embodiments, the light diffuser may not be necessary for operation of the detector, and the single SiPM may be replaced by an array of multiple SiPMs depending on a desired maximum range of detection or specified throughput of counts.

Fiber-Optic Detector Assemblies

Scintillation light derived from neutrons, gammas, charged particles, or other types of ionizing radiation, may be transmitted via fiber optics to one or more SiPMs in a system. Fiber-optic detector assemblies implemented with an SiPM, as compared to a PMT, are cheaper, smaller, resistant to mechanical shock, have enhanced position sensitivity, are relatively insensitive to magnetic fields, and are much more easily positioned in a large array. Furthermore, couplings between SiPMs and fiber optics are much easier to implement than couplings between fiber optics and conventional PMTs.

Figure 24:
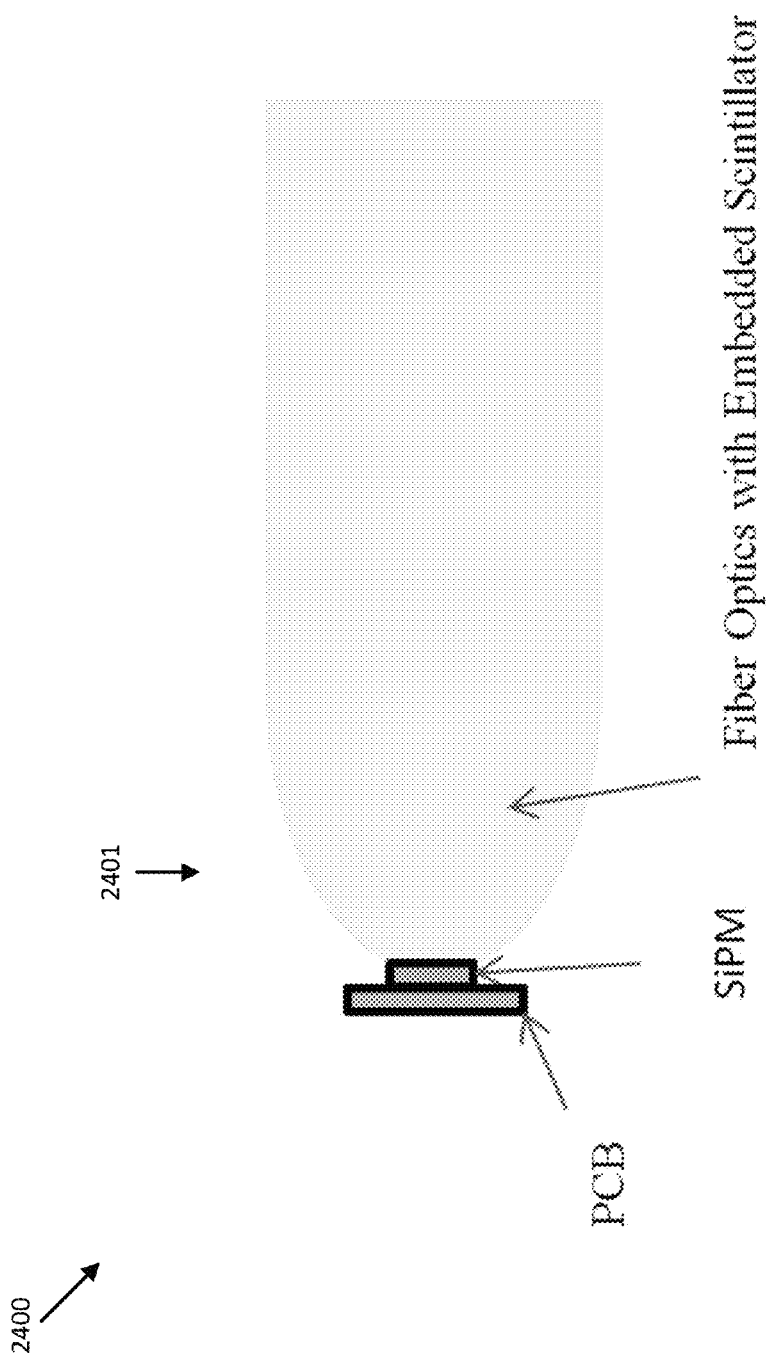
FIG. 24 illustrates a block diagram of an SiPM-based radiation detection system in accordance with an embodiment of the disclosure.

Fibers in fiber-optic detector assemblies may transmit scintillation light from an external scintillator, for example, or may transmit light from a $^6$LiI(Eu) scintillator embedded within the fibers themselves. FIG. 24 shows system 2400 illustrating a fiber-optic detector (e.g., SiPM-based fiber-optic detector 2401), where the fiber includes an embedded scintillator. Fiber-optic detector assemblies may be used to pack a large number of discrete scintillators (embedded or coupled) into a relatively small volume. For example, portal detector 1480 of FIG. 14 may be shaped to place a number of scintillators in a pattern that is more easily implemented through fiber-optic coupling between the scintillators and their SiPMs. In another embodiment, directionality detection may be improved by increasing the number of discrete detector assemblies in a particular volume, as described herein.

In some embodiments, an SiPM-based light detector may be used in place of one or more avalanche photodiodes (APD's). As compared to an APD, an SiPM-based light detector would have reduced sensitivity to temperature, increased gain (e.g., from 100-1000 gain of APD to 3.0E6 gain with SiPM, which allows the SiPMs to operate reliably with smaller signals over longer distances), and lower voltage operation.

Figure 25:
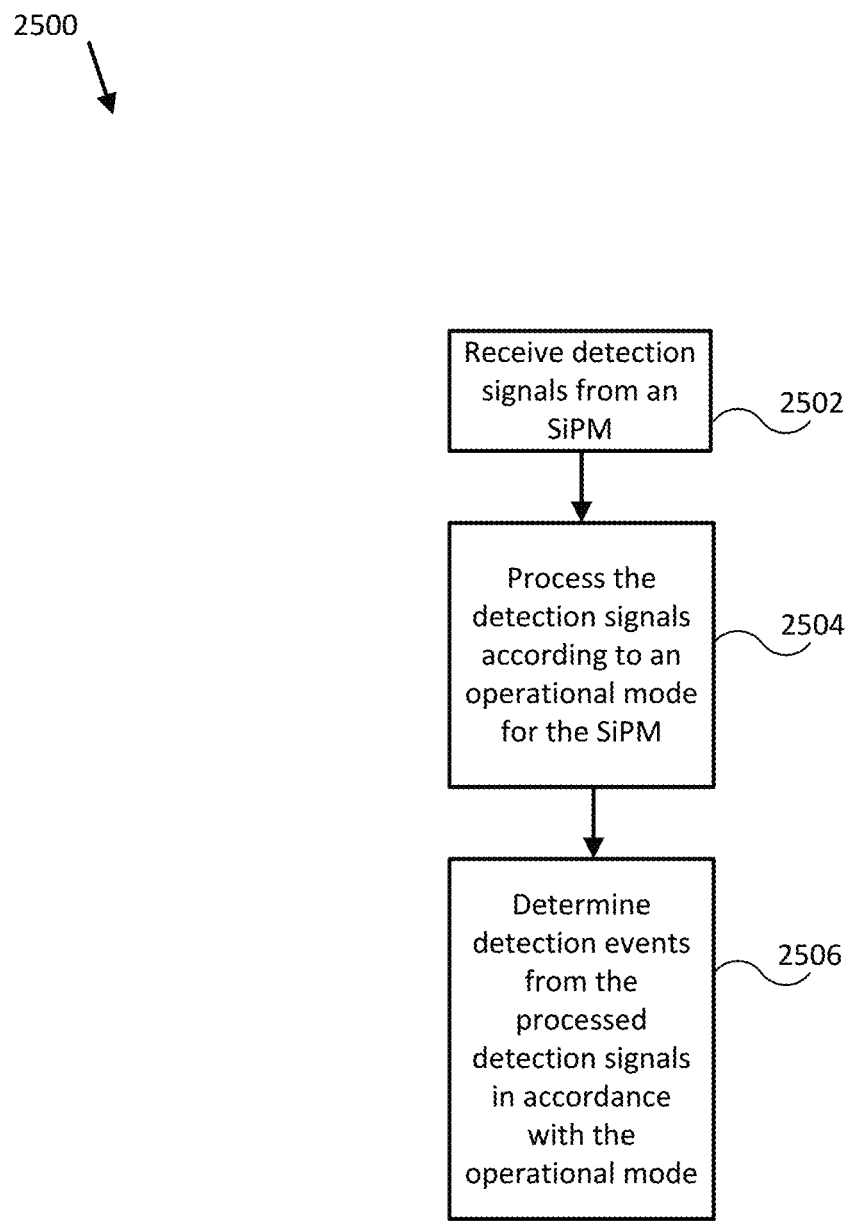
FIG. 25 illustrates a flow diagram of various operations to provide SiPM-based radiation detection and reporting in accordance with an embodiment of the disclosure.

FIG. 25 illustrates a flow diagram of process 2500 to provide SiPM-based radiation detection in accordance with an embodiment of the disclosure. In some embodiments, the operations of FIG. 25 may be implemented as software instructions executed by one or more logic devices used to implement an SiPM-based radiation detection system. More generally, the operations of FIG. 25 may be implemented with any combination of software instructions, electronic hardware (e.g., inductors, capacitors, amplifiers, or other analog and/or digital components), and/or mechanical hardware used with an SiPM-based radiation detection system. It should be appreciated that any step, sub-step, sub-process, or block of process 2500 may be performed in an order or arrangement different from the embodiment illustrated by FIG. 25. Further, in some embodiments, any number of processes similar to process 2500 may be performed substantially simultaneously to produce multiple instances of phase transition detection throughout a distributed detection system, for example. Although process 2500 is described with reference to system 100E, process 2500 may be performed according to systems different from system 100E and including a different selection and/or number of modules and/or components.

In block 2502, an SiPM-based radiation detection process includes receiving detection signals from an SiPM. For example, logic device 110 of system 100E may be adapted to receive detection signals from SiPM 104 in order to enable any one or combination of operational modes and/or detector assemblies described herein. In some embodiments, logic device 110 may be adapted to receive fast timing signals from SiPM, as described herein.

In block 2504, an SiPM-based radiation detection process includes processing the detection signals received in block 2502 according to an operational mode for the SiPM. For example, logic device 110 of system 100E may be adapted to receive user input (e.g., from a user interface) selecting a Compton suppression mode, and logic device 110 may then process the detection signals received in block 2502 according to coincidence criteria applied to primary and secondary logical detectors, as described herein. In some embodiments, the processing may include simple conversion to digital signals and/or accumulation, as described herein.

In block 2506, an SiPM-based radiation detection process includes determining detection events from the processed detection signals of block 2504 in accordance with the operational mode. For example, logic device 110 of system 100E may be adapted to determine the detection events by omitting substantially coincident detection signals and/or non-coincident detection signals received from a secondary logical detector, thereby completing a Compton suppression (or directionality) process as described herein. In some embodiments, the determining may include omitting and/or including detection events according to a particular process, derived energy band, filter coefficients, and/or other processes as described herein.

By providing a compact, ruggedized, and relatively low voltage radiation detection system, embodiments of the present disclosure offer a substantially broader scope of safety devices and monitoring capability than offered by conventional PMT-based, APD-based, and high-resistivity semiconductor-based devices. Furthermore, because embodiments of the present disclosure may be adapted to detect radiation according to selective operational modes, the broader scope may be provided by relatively few detection system installations and therefore at a substantially reduced cost relative to conventional detection systems.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
one or more scintillators;
at least one SiPM adapted to receive light from the one or more scintillators; and
a logic device configured to communicate with the at least one SiPM, wherein the logic device is adapted to:
receive detection signals from the at least one SiPM;
process the detection signals according to an operational mode for the at least one SiPM; and
determine detection events from the processed detection signals in accordance with the operational mode;
wherein the operational mode comprises a directionality mode and the logic device is adapted to:
partition the at least one SiPM into a plurality of logical detectors;
process the detection signals according to coincidence criteria applied to adjacent logical detectors;
determine the detection events by omitting substantially non-coincident and non-adjacent detection signals; and
determine an angle of incidence for each pair of coincident detection events from energy and timing responses for each pair of coincident detection events.

2. The system of claim 1, wherein:
the at least one SiPM comprises two or more SIPMs.

3. The system of claim 1, wherein the logical detectors are disposed in a three dimensional array, and wherein each angle of incidence is a three dimensional projection.

4. The system of claim 1, further comprising an absolute orientation sensor and a display configured to communicate with the logic device, wherein the logic device is adapted to:
receive an absolute orientation of the at least one SiPM and/or the one or more scintillators from the orientation sensor;
derive an absolute direction from the angles of incidence using the absolute orientation; and
provide the absolute direction to the display to indicate the absolute direction to a user.

5. A method of using the system of claim 1, the method comprising:
receiving the detection signals from the at least one SiPM;
processing the detection signals according to the operational mode for the at least one SiPM; and
determining the detection events from the processed detection signals in accordance with the operational mode.

6. The method of claim 5, further comprising:
partitioning the at least one SiPM into the plurality of logical detectors;
processing the detection signals according to the coincidence criteria applied to adjacent logical detectors;
determining the detection events by omitting the substantially non-coincident and non-adjacent detection signals; and
determining the angle of incidence for each pair of coincident detection events from the energy and timing responses for each pair of coincident detection events.

7. The method of claim 6, wherein the logical detectors are disposed in a three dimensional array, and wherein each angle of incidence is a three dimensional projection.

8. The method of claim 6, further comprising:
receiving an absolute orientation of the at least one SiPM and/or the one or more scintillators from an orientation sensor;
deriving an absolute direction from the angles of incidence using the absolute orientation; and
providing the absolute direction to a display to indicate the absolute direction to a user.

9. A system comprising:
one or more scintillators;
at least one SiPM adapted to receive light from the one or more scintillators; and
a logic device configured to communicate with the at least one SiPM, wherein the logic device is adapted to:
receive detection signals from the at least one SiPM;
process the detection signals according to an operational mode for the at least one SiPM; and
determine detection events from the processed detection signals in accordance with the operational mode;
wherein the operational mode comprises a stabilization mode, the detection signals correspond to a known radiation source having a known peak position, and the logic device is adapted to:
process the detection signals by determining a peak position associated with each detection signal and by determining signal characteristics of each detection signal;
determine the detection events by accumulating processed detection signals into an identification spectrum;
determine an accumulated peak position from the identification spectrum;
apply an adjusted bias voltage and/or electronics gain to the at least one SiPM that substantially aligns the accumulated peak position to the known peak position;
determine a temperature of the one or more scintillators from the signal characteristics; and
modify the adjusted bias voltage, the adjusted electronics gain, and/or filter coefficients for the at least one SiPM according to the determined temperature to substantially align the accumulated peak position to the known peak position.

10. The system of claim 9, further comprising a temperature sensor adapted to measure a SiPM temperature of the at least one SiPM, wherein the logic device is adapted to:
receive the measured SiPM temperature of the at least one SiPM; and
modify the adjusted bias voltage and/or electronics gain according to the measured SiPM temperature.

11. The system of claim 9, wherein:
the one or more scintillators comprise two or more scintillators.

12. A method of using the system of claim 9, the method comprising:
processing the detection signals by determining the peak position associated with each detection signal;
determining the detection events by accumulating the processed detection signals into the identification spectrum;
determining the accumulated peak position from the identification spectrum; and
applying the adjusted bias voltage and/or electronics gain to the at least one SiPM that substantially aligns the accumulated peak position to the known peak position.

13. The method of claim 12, further comprising:
receiving the measured SiPM temperature from the temperature sensor; and
modifying the adjusted bias voltage and/or electronics gain according to the measured SiPM temperature.

14. The method of claim 12, further comprising:
processing the detection signals by determining the signal characteristics of each detection signal;
determining the temperature of the one or more scintillators from the signal characteristics; and
modifying the adjusted bias voltage, the adjusted electronics gain, and/or filter coefficients for the at least one SiPM according to the determined temperature to substantially align the accumulated peak position to the known peak position.

15. A system comprising:
one or more scintillators;
at least one SiPM adapted to receive light from the one or more scintillators; and
a logic device configured to communicate with the at least one SiPM, wherein the logic device is adapted to:
receive detection signals from the at least one SiPM;
process the detection signals according to an operational mode for the at least one SiPM; and
determine detection events from the processed detection signals in accordance with the operational mode;
wherein the operational mode comprises a Compton suppression mode and the logic device is adapted to:
partition the at least one SiPM to form a primary logical detector and a secondary logical detector;
process the detection signals according to coincidence criteria applied to the primary and secondary logical detectors; and
determine the detection events by omitting substantially coincident detection signals and/or non-coincident detection signals received from the secondary logical detector.

16. A method of using the system of claim 15, the method comprising:
partitioning the at least one SiPM to form the primary logical detector and the secondary logical detector;
processing the detection signals according to the coincidence criteria applied to the primary and secondary logical detectors; and
determining the detection events by omitting the substantially coincident detection signals and/or non-coincident detection signals received from the secondary logical detector.

17. A system comprising:
one or more scintillators;
at least one SiPM adapted to receive light from the one or more scintillators; and
a logic device configured to communicate with the at least one SiPM, wherein the logic device is adapted to:
receive detection signals from the at least one SiPM;
process the detection signals according to an operational mode for the at least one SiPM; and
determine detection events from the processed detection signals in accordance with the operational mode;
wherein the operational mode comprises a ruggedized mode and the logic device is adapted to:
partition the at least one SiPM into a plurality of logical detectors;
determine one of the logical detectors is malfunctioning; and
de-energize the malfunctioning logical detector.

18. A method of using the system of claim 17, the method comprising:
partitioning the at least one SiPM into the plurality of logical detectors;
determining the one of the logical detectors is malfunctioning; and
de-energizing the malfunctioning logical detector.

19. A system comprising:
one or more scintillators;
at least one SiPM adapted to receive light from the one or more scintillators; and
a logic device configured to communicate with the at least one SiPM, wherein the logic device is adapted to:
receive detection signals from the at least one SiPM;
process the detection signals according to an operational mode for the at least one SiPM; and
determine detection events from the processed detection signals in accordance with the operational mode;
the system further comprising a low-voltage portable power supply, wherein the operational mode is selectable from a personal radiation detector (PRD) mode, a spectroscopic personal radiation detector (SPRD) mode, and a radioisotope identification device (RID) mode, and wherein the logic device is adapted to:
determine a count rate, dose rate, an energy spectrum, an identification spectrum, and/or a source radioisotope in accordance with a selected operational mode.

20. The system of claim 19, further comprising a communication module, wherein the logic device is adapted to:
form a communication link with an external personal electronic device using the communication module; and
control the external personal electronic device to determine and/or display at least one of the count rate, dose rate, an identification spectrum, and/or a source radioisotope.

21. A method of using the system of claim 19, the method comprising:
determining the count rate, the dose rate, the energy spectrum, the identification spectrum, and/or the source radioisotope in accordance with the selected operational mode.

22. The method of claim 21, further comprising:
  forming a communication link with an external personal electronic device using a communication module; and
  controlling the external personal electronic device to determine and/or display at least one of the count rate, dose rate, an identification spectrum, and/or a source radioisotope.

* * * * *